United States Patent
Jin et al.

(10) Patent No.: US 12,526,112 B2
(45) Date of Patent: Jan. 13, 2026

(54) METHOD FOR SENDING DEMODULATION REFERENCE SIGNAL, METHOD FOR RECEIVING DEMODULATION REFERENCE SIGNAL, AND COMMUNICATION APPARATUS

(71) Applicant: HUAWEI TECHNOLOGIES CO., LTD., Shenzhen (CN)

(72) Inventors: Huangping Jin, Shanghai (CN); Xiaohan Wang, Shanghai (CN); Wei Han, Shanghai (CN); Shibin Ge, Shanghai (CN); Xiang Ren, Boulogne Billancourt (FR); Yong Liu, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 18/191,350

(22) Filed: Mar. 28, 2023

(65) Prior Publication Data

US 2023/0239111 A1    Jul. 27, 2023

Related U.S. Application Data

(63) Continuation of application No. PCT/CN2021/119275, filed on Sep. 18, 2021.

(30) Foreign Application Priority Data

Sep. 30, 2020 (CN) .......................... 202011055509.8

(51) Int. Cl.
*H04L 5/06* (2006.01)
*H04L 5/00* (2006.01)

(52) U.S. Cl.
CPC .......... *H04L 5/0051* (2013.01); *H04L 5/0005* (2013.01)

(58) Field of Classification Search
CPC ... H04L 5/0051; H04L 5/0005; H04L 5/0094; H04L 25/0226; H04L 25/0228;
(Continued)

(56) References Cited

U.S. PATENT DOCUMENTS

2019/0068308 A1* 2/2019 Shin ...................... H04L 5/0023

FOREIGN PATENT DOCUMENTS

CN    108631986 A  * 10/2018 ........... H04L 5/0048
CN    110912666 A    3/2020
(Continued)

OTHER PUBLICATIONS

Huawei, HiSilicon, Design of DL DMRS for data transmission, 3GPP TSG RAN WG1 Meeting #88bis, Spokane, USA, Apr. 3-7, 2017, R1-1704233 (Year: 2017).*
(Continued)

*Primary Examiner* — Kevin T Bates
(74) *Attorney, Agent, or Firm* — Rimon PC

(57) ABSTRACT

This application discloses a method for sending a demodulation reference signal. In the method, a network device generates a first signal and sends the first signal on a first time-frequency resource. The first signal is formed by superimposing M DMRS port signals, and the delay segmentation locations corresponding to at least two of the M DMRS port signals are different. Because the first signal is formed by superposing the M DMRS port signals, that is, the network device sends a plurality of DMRS port signals on a same time-frequency resource, reference signal overheads can be reduced. The network device can send more DMRS port signals using the same amount time-frequency resources. In this way, the network device can send more streams without increasing signaling overheads.

16 Claims, 8 Drawing Sheets

(58) Field of Classification Search
CPC .............. H04L 25/0246; H04L 25/025; H04L 25/0204; H04B 7/0456
See application file for complete search history.

(56) References Cited

FOREIGN PATENT DOCUMENTS

KR      20190056515 A  *  5/2019
WO       2018174677 A1     9/2018

OTHER PUBLICATIONS

LG Electronics, Evaluation Result of NR DMRS. 3GPP TSG RAN WG1 NR Ad-Hoc Meeting, Spokane, USA, Jan. 16-20, 2017, R1-1700481, 6 pages.
Guangdong OPPO Mobile Telecom, Transmit diversity and DMRS port design for NR PDCCH. 3GPP TSG RAN WG1 meeting #88bis, Spokane, Washington, USA Apr. 3-7, 2017, R1-1704614, 5 pages.
Huawei et al: "Design of DL DMRS for data transmission," 3GPP TSG RAN WG1 Meeting #88bis, Spokane, USA, Apr. 3-7, 2017, R1-1704233; 6 pages.

* cited by examiner

METHOD FOR SENDING DEMODULATION REFERENCE SIGNAL, METHOD FOR RECEIVING DEMODULATION REFERENCE SIGNAL, AND COMMUNICATION APPARATUS

CROSS-REFERENCE TO RELATED APPLICATIONS

This application is a continuation of International Application No. PCT/CN2021/119275, filed on Sep. 18, 2021, which claims priority to Chinese Patent Application No. 202011055509.8, filed on Sep. 30, 2020. The disclosures of the aforementioned applications are hereby incorporated by reference in their entireties.

TECHNICAL FIELD

This application relates generally to the field of antenna technologies, and in particular, to a method for sending a demodulation reference signal, a method for receiving a demodulation reference signal, and a communication apparatus.

BACKGROUND

To improve a throughput of a system, the multiple input and multiple output (MIMO) technology is introduced. With the MIMO technology, a base station needs to perform signal precoding based on downlink channel state information (CSI) when sending data to a terminal. For a time division duplex (TDD) system, an uplink channel and a downlink channel have reciprocity due to the use of the same bandwidth, and the base station side can obtain the CSI of the downlink channel through the uplink channel based on the reciprocity between the uplink channel and the downlink channel, and use the CSI of the downlink channel to perform signal precoding.

The base station calculates, based on an uplink reference signal, precoding required for sending downlink data. To assist in data demodulation by a terminal, the base station sends a demodulation reference signal (DMRS) when sending the data. The DMRS may be used to estimate a precoded equivalent channel by the terminal. Generally, the same precoding processing is performed on the DMRS and the data. In this way, the terminal can obtain, on a time-frequency resource on which a DMRS port is located, an equivalent channel corresponding to the DMRS port through estimation based on a reference signal of the DMRS port predefined in a protocol.

Currently, the base station sends a small quantity of DMRS port signals on a same time-frequency resource. As a result, the terminal receives a small quantity of streams, and the accuracy of channel estimation result is low.

SUMMARY

This application provides a method for sending a DMRS, a method for receiving a DMRS, and a communication apparatus, to ensure better channel estimation performance and higher channel estimation accuracy.

According to a first aspect, an embodiment of this application provides a method for receiving a demodulation reference signal. The method may be performed by a first communication apparatus. The first communication apparatus may be a communication device (for example, a terminal side device) or an apparatus that can support a communication device in implementing a function required in the method, for example, a chip or a chip system. The method includes:

receiving a first signal on a first time-frequency resource, and determining M DMRS port signals from the first signal based on delay segmentation locations, where the first signal is formed by superimposing the M DMRS port signals, delay segmentation locations corresponding to at least two of the M DMRS port signals are different, and M is an integer greater than or equal to 2.

In embodiments of this application, the delay segmentation locations corresponding to the at least two DMRS port signals are different, and a quantity of multiplexed DMRS ports may be increased on a same time-frequency resource, that is, a network device sends more DMRS port signals on the same time-frequency resource. Because more DMRS ports may be multiplexed on the same time-frequency resource, the network device can send more streams without increasing pilot signaling overheads. For a terminal, because more reference signal streams are available, a more accurate channel estimation can be obtained.

According to a second aspect, an embodiment of this application provides a method for sending a DMRS. The method may be performed by a second communication apparatus. The second communication apparatus may be a communication device (for example, a network device) or an apparatus that can support a communication device in implementing a function required in the method, for example, a chip or a chip system. The method includes:

generating a first signal, and sending the first signal on a first time-frequency resource, where the first signal is formed by superimposing M DMRS port signals, delay segmentation locations corresponding to at least two of the M DMRS port signals are different, and M is an integer greater than or equal to 2.

In embodiments of this application, the network device can increase a quantity of multiplexed DMRS ports on a same time-frequency resource based on different delay segmentation locations of DMRS port signals, that is, the network device can send more DMRS port signals on the same time-frequency resource. Because more DMRS ports may be multiplexed on the same time-frequency resource, the network device can send more reference signal streams without increasing pilot overheads. For a terminal, because more reference signal streams are available, a more accurate channel estimation can be obtained.

In a possible implementation of the first aspect, the method further includes: receiving indication information, where the indication information indicates the delay segmentation locations of the M DMRS port signals.

In a possible implementation of the second aspect, the method further includes: sending indication information, where the indication information indicates the delay segmentation locations respectively corresponding to the M DMRS port signals.

A network side may notify the terminal of the delay segmentation locations of the M DMRS port signals in the first signal, so that the terminal can distinguish the DMRS port signals from the first signal based on the delay segmentation locations.

In a possible implementation of the first aspect or the second aspect, there is a first correspondence between M DMRS ports corresponding to the M DMRS port signals and the delay segmentation locations. It may be understood that the first correspondence may be preset. Because the DMRS port signals are sent through the DMRS ports, a delay segmentation location corresponding to a DMRS port is also a delay segmentation location corresponding to a DMRS port signal sent through the DMRS port. In this solution, there is the first correspondence between the M DMRS ports corresponding to the M DMRS port signals and the delay segmentation locations. In this case, the terminal can determine, based on the M DMRS ports and the first correspondence, the delay segmentation locations respectively corresponding to the M DMRS port signals without an additional indication from the network side of the delay segmentation location, thereby reducing signaling overheads.

In a possible implementation of the first aspect or the second aspect, there is at least one DMRS port in the M DMRS ports corresponding to the M DMRS port signals, and for any one of the at least one DMRS port, delay segmentation locations corresponding to physical resource groups (PRGs) associated with the DMRS port are the same; or there is at least one DMRS port in the M DMRS ports corresponding to the M DMRS port signals, and for any one of the at least one DMRS port, delay segmentation locations corresponding to at least two of the PRGs associated with the DMRS port are different.

In some solutions, the network side may determine the indication information depending on whether the delay segmentation locations corresponding to the PRGs associated with any one of the at least one DMRS port are the same or different. When the delay segmentation locations corresponding to the PRGs associated with the at least one DMRS port are the same, the quantity of bits of the indication information does not depend on which PRG, and overheads of the quantity of bits of the indication information are low. In addition, it can be ensured that the quantity of bits of the indication information is known by both the network side and the terminal, so that the terminal can receive a DMRS port signal at a correct delay segmentation location. When the delay segmentation locations corresponding to at least two of the PRGs associated with the at least one DMRS port are different, different PRGs may correspond to different delay segmentation locations, and the network side can send DMRS port signals more flexibly.

In a possible implementation of the first aspect or the second aspect, there is a second correspondence between a size of a PRG associated with any DMRS port and a quantity of delay segmentation locations corresponding to the DMRS port. Different sizes of PRGs associated with a DMRS port may correspond to different quantities of delay segmentation locations corresponding to the DMRS port, and therefore the overheads of the indication information may also be different. In this solution, a correspondence, that is, the second correspondence, between a size of a PRG associated with a DMRS port and a quantity of delay segmentation locations corresponding to the DMRS port may be specified. Based on the second correspondence, the network side and the terminal determine the overheads of the indication information, to ensure that the terminal correctly decodes the indication information and receives a DMRS port signal at a correct delay segmentation location.

In a possible implementation of the first aspect or the second aspect, there is a third correspondence between a size of a PRG associated with a DMRS port and a frequency-domain reference signal density of the DMRS port. It should be understood that, for example, a larger size of a PRG associated with a DMRS port indicates a smaller frequency-domain reference signal density of the DMRS port, and reference signal overheads can be reduced. In this solution, a correspondence, that is, the third correspondence, between the size of a PRG associated with a DMRS port and the frequency-domain reference signal density of the DMRS port may be specified. In this way, the frequency-domain reference signal density of the DMRS port is determined by a PRB bundling size, that is, a clear manner of determining the frequency-domain reference signal density of the DMRS port is provided.

In a possible implementation of the first aspect or the second aspect, the indication information occupies L bits, and the L bits jointly indicate M delay segmentation locations, and L is an integer greater than or equal to 1; or the L bits respectively indicate M delay segmentation locations, and L is equal to M.

In this solution, the indication information may independently indicate the M delay segmentation locations, or may jointly indicate the M delay segmentation locations, to reduce the signaling overheads further.

According to a third aspect, an embodiment of this application provides a communication apparatus. The communication apparatus has a function of implementing behavior of the foregoing method embodiment in the first aspect. The function may be implemented by hardware, or may be implemented by hardware executing corresponding software. The hardware or the software includes one or more modules corresponding to the foregoing function.

As an example, the communication apparatus includes a transceiver module (e.g., a transceiver circuit) and a processing module (e.g., a processing circuit or processing circuits). The transceiver module is configured to receive a first signal on a first time-frequency resource, where the first signal is formed by superimposing M DMRS port signals, delay segmentation locations corresponding to at least two of the M DMRS port signals are different, and M is an integer greater than or equal to 2; and the processing module is configured to determine the M DMRS port signals from the first signal based on the delay segmentation locations.

According to a fourth aspect, an embodiment of this application provides a communication apparatus. The communication apparatus has a function of implementing behavior of the foregoing method embodiment in the second aspect. The function may be implemented by hardware, or may be implemented by hardware executing corresponding software. The hardware or the software includes one or more modules corresponding to the foregoing function.

In some embodiments, the communication apparatus includes a transceiver module and a processing module. The processing module is configured to generate a first signal, where the first signal is formed by superimposing M DMRS port signals, delay segmentation locations corresponding to at least two of the M DMRS port signals are different, and M is an integer greater than or equal to 2; and the transceiver module is configured to send the first signal on a first time-frequency resource.

In a possible implementation of the third aspect, the transceiver module is further configured to receive indication information, where the indication information indicates the delay segmentation locations respectively corresponding to the M DMRS port signals.

In a possible implementation of the fourth aspect, the transceiver module is further configured to send indication information, where the indication information indicates delay segmentation locations respectively corresponding to the M DMRS port signals.

In a possible implementation of the third aspect or the fourth aspect, there is a first correspondence between M DMRS ports corresponding to the M DMRS port signals and the delay segmentation locations.

In a possible implementation of the third aspect or the fourth aspect, there is at least one DMRS port in the M DMRS ports corresponding to the M DMRS port signals, and for any one of the at least one DMRS port, delay segmentation locations corresponding to all PRGs associated with the DMRS port are the same; or there is at least one DMRS port in the M DMRS ports corresponding to the M DMRS port signals, and for any one of the at least one DMRS port, delay segmentation locations corresponding to at least two of the PRGs associated with the DMRS port are different.

In a possible implementation of the third aspect or the fourth aspect, there is a second correspondence between a size of a PRG associated with any DMRS port and a quantity of delay segmentation locations corresponding to the DMRS port.

In a possible implementation of the third aspect or the fourth aspect, there is a third correspondence between a size of a PRG associated with any DMRS port and a frequency-domain reference signal density of the DMRS port.

In a possible implementation of the third aspect or the fourth aspect, the indication information occupies L bits, and the L bits jointly indicate M delay segmentation locations, and L is an integer greater than or equal to 1; or the L bits respectively indicate M delay segmentation locations, and L is equal to M.

For technical effects brought by the third aspect or the possible implementations of the third aspect, refer to the descriptions of the technical effects of the first aspect or the possible implementations of the first aspect. For technical effects brought by the fourth aspect or the possible implementations of the fourth aspect, refer to the descriptions of the technical effects of the second aspect or the possible implementations of the second aspect.

According to a fifth aspect, an embodiment of this application provides a communication apparatus, including at least one processor. The processor may be configured to execute a computer program, to implement the method in any possible implementation of the first aspect. Optionally, the communication apparatus further includes a communication interface. The processor is coupled to the communication interface. The communication interface is configured to input and/or output information, and the information includes at least one of a computer program, instructions, and data. Optionally, the communication apparatus further includes a memory. The memory is configured to store at least one of a computer program, instructions, and data. The processor is coupled to the memory.

In an implementation, the communication apparatus is a terminal device or a network device. When the communication apparatus is the terminal device or the network device, the communication interface may be a transceiver, or an input and/or output interface. Optionally, the transceiver may be a transceiver circuit, or may be implemented by using an antenna, a feeder, a coder/decoder, and the like in the terminal device or the network device. Optionally, the input and/or output interface may be an input and/or output circuit.

In another implementation, the communication apparatus is a chip or a chip system configured in a terminal device or a network device. When the communication apparatus is the chip or the chip system configured in the terminal device or the network device, the communication interface may be an input and/or output interface, an interface circuit, an output circuit, an input circuit, a pin, a related circuit, or the like. The processor may alternatively be a processing circuit or a logic circuit.

According to a sixth aspect, an embodiment of this application provides a chip system. The chip system includes at least one processor, and may further include a communication interface, configured to implement the method performed by the communication apparatus in the third aspect or the fourth aspect. In a possible implementation, the chip system further includes a memory, configured to store program instructions and/or data. The chip system may include a chip, or may include a chip and another discrete component.

According to a seventh aspect, an embodiment of this application provides a communication system. The communication system includes the communication apparatus in the third aspect and the communication apparatus in the fourth aspect.

According to an eighth aspect, this application provides a computer-readable storage medium, storing a computer program, where when the computer program is run, the method in any one of the possible implementations of the first aspect and the second aspect is implemented.

According to a ninth aspect, a computer program product is provided, including computer program code. When the computer program code is run, the method in any one of the possible implementations of the first aspect and the second aspect is implemented.

For beneficial effects of the fifth aspect to the ninth aspect and the implementations of the fifth aspect to the ninth aspect, refer to the descriptions of the beneficial effects of the method in the first aspect or the second aspect and the implementations of the first aspect or the second aspect.

DESCRIPTION OF EMBODIMENTS

Figure 1:
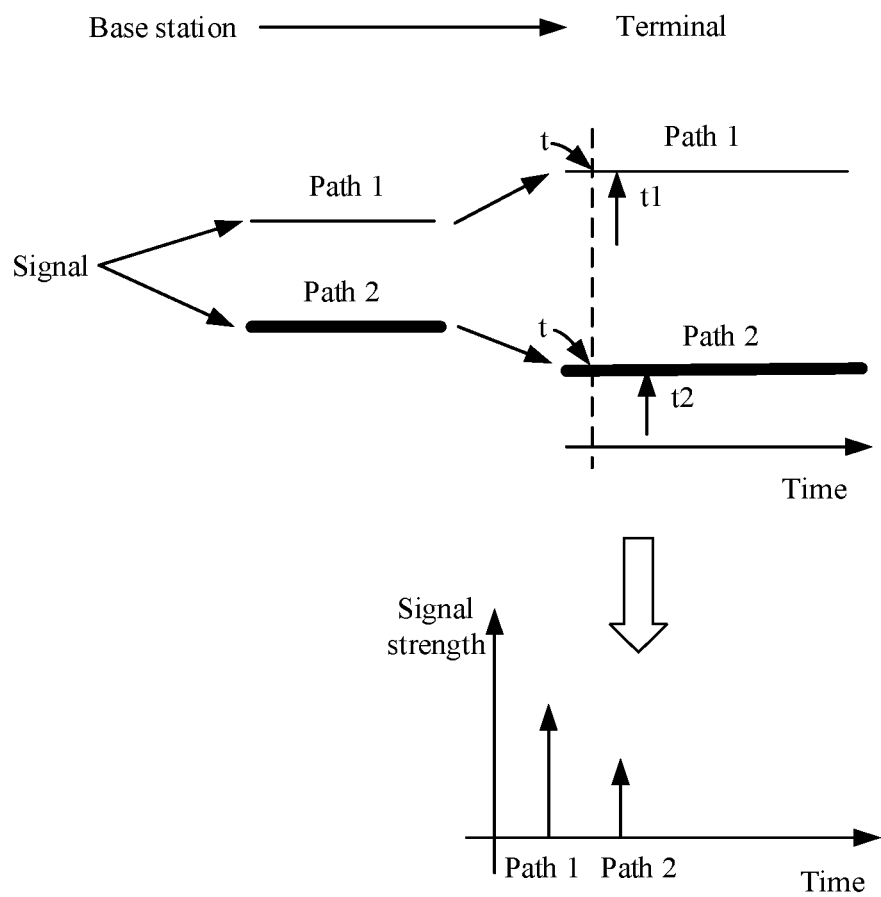
FIG. 1 is a flowchart of sending signals through a plurality of paths according to an embodiment of this application.

To make objectives, technical solutions, and advantages of embodiments of this application clearer, the following further describes embodiments of this application in detail with reference to the accompanying drawings.

To help a person skilled in the art understand the technical solutions provided in embodiments of this application, some terms in embodiments of this application are first explained and described.

(1) Network side device, also referred to as a network device, is an entity configured to transmit or receive a signal on a network side, and is a device that connects a terminal side device to a wireless network, generally, to a core network, for example, a new generation Node B (gNodeB), through a line link (for example, an optical fiber cable) in a communication system. The network side device may be responsible for receiving data from the core network and forwarding the data to a wireless backhaul device, or receiving data from a wireless backhaul device and forwarding the data to the core network. The network device may be a device configured to communicate with a mobile device. The network device may be an access point (AP) in a wireless local area network (WLAN) or an evolutional Node B (eNB or eNodeB) in long term evolution (LTE), or may include a next generation node B (gNB) in a new radio (NR) system, a relay station or an access point, an in-vehicle device, a wearable device, and a network device in a future 5G network, a network device in a future evolved public land mobile network (PLMN), a gNodeB/gNB in an NR system, or the like. The following uses an example in which the network side device is the gNB.

The gNB may include an antenna, a baseband unit (BBU), and a remote radio unit (RRU). The BBU may be connected to the RRU through a common public radio interface (CPRI), an enhance CPRI (eCPRI), or the like, and the RRU may be connected to the antenna through a feeder. The antenna may be a passive antenna, and is separated from the RRU and may be connected to the RRU through a cable. Alternatively, the antenna may be an active antenna unit (AAU), that is, an antenna unit of the AAU and the RRU are integrated together. The AAU implements some physical layer processing functions, radio frequency processing, and a function related to an active antenna.

In some deployments, the gNB may include a centralized unit (CU) and a distributed unit (DU). The CU implements some functions of the gNB, and the DU implements some functions of the gNB. For example, the DU may be configured to send and receive a radio frequency signal, perform conversion between the radio frequency signal and a baseband signal, and perform partial baseband processing. The CU may be configured to perform baseband processing, control a base station, and the like. In some embodiments, the CU is responsible for processing a non-real-time protocol and service, to implement functions of a radio resource control (RRC) layer and a packet data convergence protocol (PDCP) layer. The DU is responsible for processing a physical layer protocol and a real-time service, to implement functions of a radio link control (radio link control, RLC) layer, a medium access control (MAC) layer, and a physical (PHY) layer. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

(2) Terminal side device, also referred to as a terminal device or a terminal, may be a wireless terminal device that can receive scheduling and an indication of the network device. The terminal side device may be a device that provides a user with voice and/or data connectivity, a handheld device having a wireless connection function, or another processing device connected to a wireless modem.

The terminal side device may communicate with one or more core networks or the Internet through a radio access network (RAN), and exchange voice and/or data with the RAN. The terminal side device may include user equipment (UE), a wireless terminal device, a mobile terminal device, a device-to-device (D2D) communication terminal device, a V2X terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal may include a mobile phone (or referred to as a "cellular" phone), a computer with a mobile terminal device, or a portable, pocket-sized, handheld, or computer built-in mobile apparatus. For another example, the terminal may include a virtual reality (VR) terminal device, an augmented reality (AR) terminal device, a wireless terminal in industrial control (industrial control), a wireless terminal in self-driving, a wireless terminal in remote medical surgery, a wireless terminal in a smart grid, a wireless terminal in transportation safety, a wireless terminal in a smart city, a wireless terminal in a smart home, and a terminal device in a future evolved public land mobile network (PLMN), a vehicle device in vehicle to everything (V2X), customer premises equipment (CPE), and the like. For still another example, the terminal may include a device such as a personal communications service (PCS) phone, a cordless telephone set, a session initiation protocol (SIP) phone, a wireless local loop (WLL) station, or a personal digital assistant (PDA). Alternatively, the terminal may further include a limited device, for example, a device with low power consumption, a device with a limited storage capability, or a device with a limited computing capability. For example, the terminal includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs. If the various terminal devices described above are located in a vehicle (for example, placed in the vehicle or installed in the vehicle), the terminal devices may be all considered as in-vehicle terminal devices. For example, the in-vehicle terminal devices are also referred to as on-board units (OBU).

In embodiments of this application, the network device and the terminal may be deployed on land, including an indoor or outdoor scenario, and a handheld or an in-vehicle scenario; or may be deployed on water; or may be deployed on an aircraft, a balloon, or a satellite in the air. Application scenarios of the network device and the terminal are not limited in embodiments of this application.

(3) Delay domain is delay space formed by multipath delays of a signal, or may be understood as a change domain of a frequency domain signal. A multipath effect occurs during radio signal transmission. That is, a signal is transmitted to a receive end through a plurality of transmission paths. It should be understood that, because a delay exists in a signal transmission process, delays corresponding to different paths may be different. In this case, after signals pass through a plurality of paths, the time at which the signals arrive at the receive end may be different due to the delays. Due to a phase difference caused by different delays of different paths, some signals are strong and some signals are weak in frequency after signals on the plurality of paths are combined. In other words, if transmission delays of different transmission paths are different, it leads to the so-called frequency selective fading of a frequency domain signal.

For ease of understanding, FIG. 1 shows a process of sending signals through a plurality of paths. In FIG. 1, an example in which signals are sent through two paths (path 1 and path 2) is used. Signals on a base station side are transmitted to a terminal through path 1 and path 2. Due to delays of path 1 and path 2, the times at which the signals are transmitted to the terminal side through path 1 and path 2 may be different. Absolute time t is used as a reference time node and corresponds to path 1 and path 2. The time at which the signal arrives at the terminal through path 1 of a channel is t1, the time at which the signal arrives at the terminal through path 2 of the channel is t2, and t1 is not equal to t2.

The signal transmitted through path 1 is g(t−t1), and it is assumed that t1=0, that is, the signal is g(t). The signal transmitted through path 2 is g(t−t2), and it is assumed that t2=$t_0$, that is, the signal is g(t−$t_0$).

For the signal g(t), there is a formula (1) for converting the signal to the frequency domain through Fourier transform:

$$F(g(t))=\int_{-\infty}^{+\infty}g(t)e^{j\omega t}dt \quad (1)$$

For the signal g(t−$t_0$), there is a formula (2) for converting the signal to the frequency domain through Fourier transform:

$$F(g(t-t_0))=\int_{-\infty}^{+\infty}g(t-t_0)e^{j\omega t}dt=e^{j\omega t_0}F(g(t)) \quad (2)$$

In the formula (1) and the formula (2), ω is a frequency variable, and different frequencies correspond to different phase rotations. x(t)=g(t)+g(t−$t_0$), to obtain a function X(ω)= g(ω)(1+$e^{j\omega t_0}$) of the frequency variable, that is, the signals transmitted through path 1 and path 2 are superimposed. g(ω)≡1, to obtain X(ω)=1+$e^{j\omega t_0}$. Due to a phase difference caused by different delays of a plurality of paths, the strength of some signals is strong and the strength of some signals is weak in frequency after the signals on the plurality of paths are superimposed.

(4) Delay segmentation location may indicate a location, in a delay domain, of a signal delay at which a signal arrives at a receive end through a plurality of paths of a channel. The location corresponds to an interval in the delay domain, and the interval may be considered as a delay segmentation location.

(5) PRB bundling size indicates that a specific quantity of physical resource blocks (PRBs) are bound. A physical resource block group (PRG) is a bundle including a plurality of physical resource blocks (PRBs). One PRG may correspond to one PRB bundling size, or may correspond to two PRB bundling sizes. This is not limited in this application. Generally, in a same PRG, the network device adopts the same precoding, and the terminal side performs channel estimation in a PRG. In embodiments of this application, precoding used by a plurality of PRBs in a PRG may be the same or may be different, and the terminal side still performs channel estimation in a PRG. It should be noted that, in embodiments of this application, the PRG and the PRB bundling size may be interchanged. In other words, a solution applicable to the PRG is also applicable to the PRB bundling size.

The foregoing describes some concepts in embodiments of this application, and the following describes technical characteristics in embodiments of this application.

In a new radio (NR) system, a MIMO technology is introduced. Due to introduction of the MIMO technology, when the network device sends data to the terminal device, modulation and coding and signal precoding need to be performed based on downlink channel information obtained by a base station. To facilitate understanding of embodiments of this application, the following first briefly describes terms used in embodiments of this application.

For a time division duplex (TDD) system, an uplink channel and a downlink channel have reciprocity due to use of a same frequency, and a base station side can obtain CSI of the downlink channel through the uplink channel based on the reciprocity between the uplink channel and the downlink channel, to perform signal precoding. For a frequency division duplex (FDD) system, the uplink channel and the downlink channel do not have reciprocity due to use of different frequencies, and naturally, the base station side cannot obtain the CSI of the downlink channel through the uplink channel. The terminal side needs to feed back the CSI of the downlink channel to the base station side.

In the descriptions of this application, "at least one" means one or more, and "a plurality of" means two or more. Terms such as "first" and "second" do not limit a quantity and an execution sequence, and the terms such as "first" and "second" do not indicate a definite difference.

In embodiments of this application, "used to indicate" may include "used to directly indicate" and "used to indirectly indicate". For example, when a piece of indication information is described as being used to indicate information I, the indication information may directly indicate I or indirectly indicate I, but it does not necessarily indicate that the indication information carries I.

Figure 2:
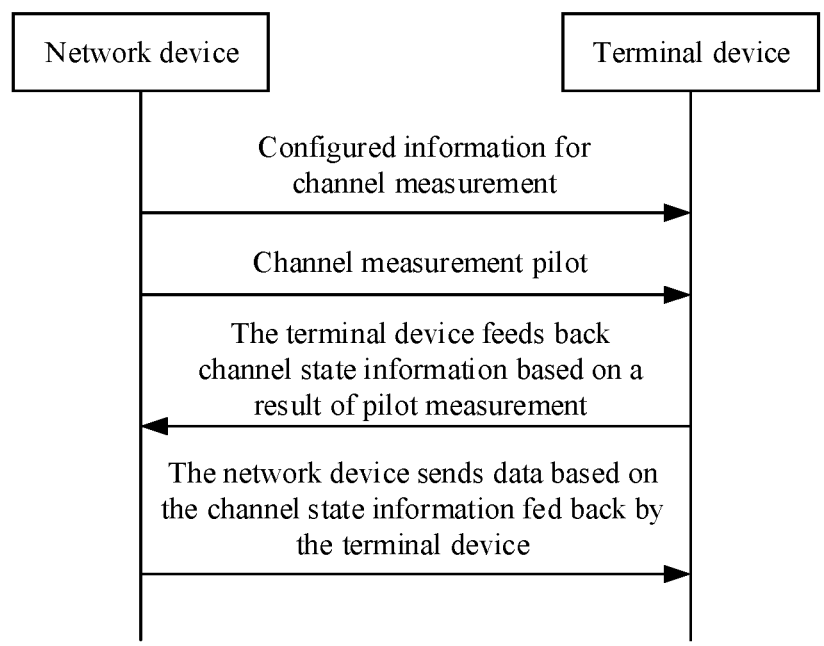
FIG. 2 is a basic flowchart of performing CSI measurement by a network device and a terminal device according to an embodiment of this application.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information. As shown in FIG. 2, FIG. 2 is a basic flowchart of performing CSI measurement by a network device and a terminal device based on FDD. The network device first sends configured signaling for channel measurement to the terminal device, to notify the terminal device to perform channel measurement. The signaling indicates time at which the terminal device needs to perform channel measurement. Then, the network device sends a reference signal (a concept of the reference signal includes a reference signal) to the terminal device for channel measurement. The terminal device performs measurement based on the reference signal sent by the network device, and performs calculation to obtain final CSI. The terminal device feeds back a CSI report to the network device, where the CSI includes information that may be used to describe a channel attribute of a communication link. The CSI report may include, but not limited to, a precoding matrix indicator (precoding matrix indicator, PMI), a rank indicator (rank Indicator, RI), a channel quality indicator (CQI), a channel state information reference signal (CSI-RS) resource indicator (CRI), a layer indicator (LI), and the like. Then, the network device sends data based on the CSI report fed back by the terminal device. For example, the network device determines, based on the RI included in the CSI report fed back by the terminal device, a quantity of streams for transmitting data to the terminal device; the network device determines, based on the CQI included in the CSI report fed back by the terminal device, a modulation order for transmitting data to the terminal device and a channel coding rate; and the network device determines, based on the PMI included in the CSI report fed back by the terminal device, precoding for transmitting data to the terminal device. It should be understood that the foregoing listed specific content of the CSI is merely an example for description, and should not constitute any limitation on embodiments of this application. The CSI may include one or more of the listed above, or may include other information for representing the CSI than those listed above. This is not limited in embodiments of this application.

In addition, the network device calculates, based on the obtained CSI, precoding required for sending data. To assist in data demodulation, the network device sends a DMRS together with the data. The DMRS may be used to estimate a precoded equivalent channel by the terminal device. Generally, a same precoding processing is performed on the DMRS and the data. In this way, the terminal device can obtain, on a time-frequency resource on which a DMRS port is located, an equivalent channel corresponding to the DMRS port through estimation based on a reference signal of the DMRS port predefined in a protocol.

Figure 3:
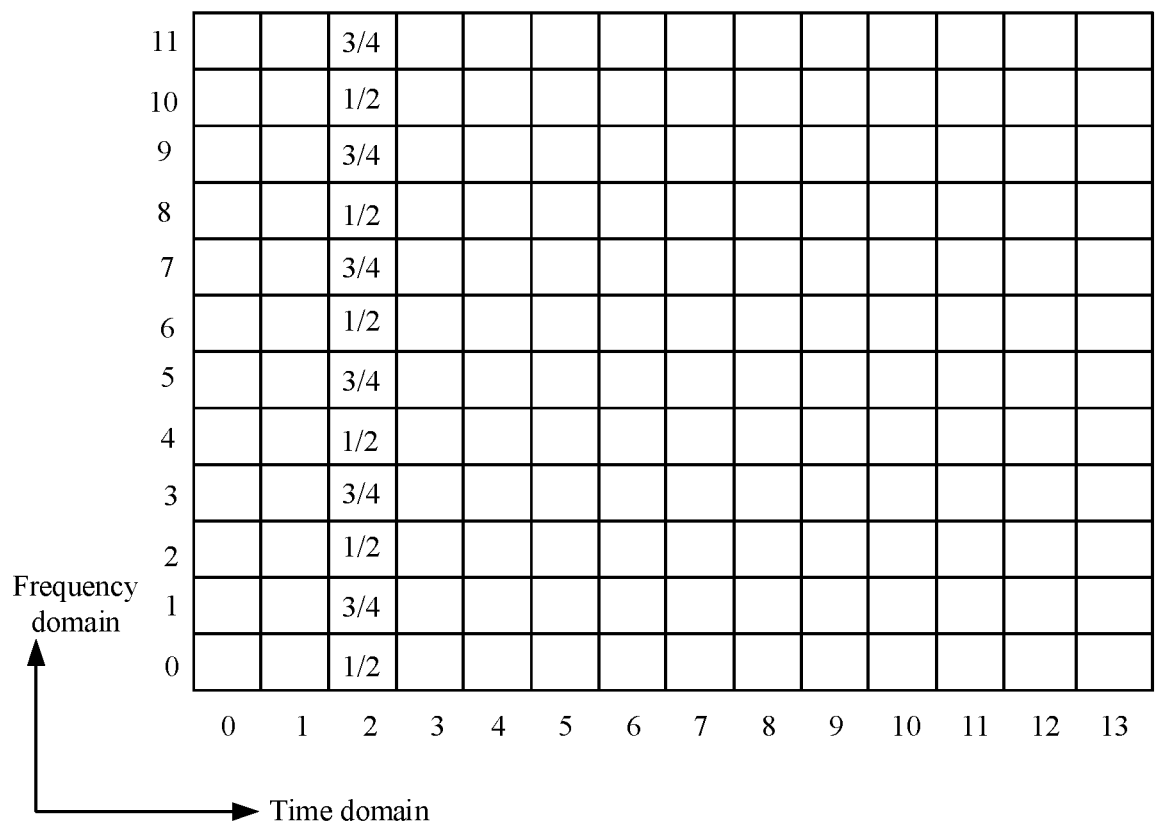
FIG. 3 is a pattern of a DMRS in an RB according to an embodiment of this application.

As an example, FIG. 3 is a pattern of a DMRS in a resource block (RB). As shown in FIG. 3, one RB includes 14 symbols in time domain, and includes 12 REs (that is, RE0, RE1, . . . , and RE11) in frequency domain. A DMRS occupies six REs in one RB. In FIG. 3, an example in which a DMRS port 1 and a DMRS port 2 multiplex six REs, and a DMRS port 3 and a DMRS port 4 multiplex six REs is used. The DMRS port 3 and the DMRS port 4 may multiplex RE1, RE3, RE5, RE7, RE9, and RE11, and the six REs may be considered as adjacent REs; and the DMRS port 1 and the DMRS port 2 may multiplex RE0, RE2, RE4, RE6, RE8, and RE10, and the six REs are also adjacent REs. That is, two adjacent REs refer to two adjacent REs in the foregoing adjacent REs. For example, the two adjacent REs may be RE1 and RE3, RE3 and RE5, RE2 and RE4, or the like.

Generally, that the terminal device performs channel estimation on an RE includes the following three steps. In the following description, an example in which a DMRS of the port 1 is estimated is used.

Step (1): Despread, that is, distinguish signals respectively sent by two adjacent REs (for a definition, refer to the foregoing explanation, for example, RE1 and RE3, or RE2 and RE4) in frequency domain.

Theoretically, one RE may be multiplexed to transmit two DMRS ports, that is, each RE carries two DMRS port signals. For example, for the DMRS port 1 and the DMRS port 2, a superimposed signal from the DMRS port 1 and the DMRS port 2 is sent on each RE of the foregoing corresponding six REs. The terminal device needs to know the DMRS signals that are respectively sent by the network device on each RE through the DMRS port 1 and the DMRS port 2.

Specifically, it is assumed that the equivalent channels of each DMRS port at locations of the two adjacent REs are the same. It may be defined that a signal on one RE of the two adjacent REs meets a formula (3), and a signal on the other RE of the two adjacent REs meets a formula (4):

$$y_{f1} = \frac{1}{\sqrt{2}}(y_{p1} + y_{p2}) \tag{3}$$

$$y_{f2} = \frac{1}{\sqrt{2}}(y_{p1} - y_{p2}) \tag{4}$$

where $y_{f1}$ is a signal sent on one RE of the two adjacent REs, $y_{f2}$ is a signal sent on the other RE of the two adjacent REs, $y_{p1}$ is a signal sent through the DMRS port 1, and $y_{p2}$ is a signal sent through the DMRS port 2. $y_{p1}$ and $y_{p2}$ may be obtained through calculation by using the formula (3) and the formula (4).

It should be noted that a despreading algorithm is not limited in embodiments of this application. For example, a quantity of REs for obtaining a channel estimation value is not limited. For example, it is not necessarily required that every two REs form a group to obtain an intermediate result of the channel estimation value, or three channel estimation values may be obtained by using four adjacent REs.

Step (2): Perform, for a port, least square (LS) estimation based on a signal received on an RE corresponding to the port and a reference signal specified in a protocol, to obtain a channel estimation value $H_{LS}$ on the corresponding RE. It should be noted that a method for obtaining the signal estimation value $H_{LS}$ based on a received signal is not limited in embodiments of this application.

Step (3): Obtain a channel estimation value, that is, a final channel estimation value, after filtering measurement based on $H_{LS}$.

Specifically, a filter matrix is generated within a physical resource block (PRB) bundling size (bundling size), for example, X RBs. Filtering processing is performed on REs in the X RBs through the filter matrix, to obtain the final channel estimation value. It should be noted that the REs in the X RBs herein include an RE with a reference signal and an RE without a reference signal. X is an integer greater than or equal to 2.

For example, the final channel estimation value may be obtained by using the following formula (5):

$$\hat{H} = R_{HH_{LS}} \left( R_{H_{LS}H_{LS}} + \frac{1}{SNR} I_{LS} \right)^{-1} H_{LS} \quad (5)$$

In the formula (5), $\hat{H}$ is the final channel estimation value, $H_{LS}$ is the channel estimation value (which is also referred to as a channel sampling value) obtained in step 2, $R_{HH_{LS}}$ is a channel correlation matrix, $R_{H_{LS}H_{LS}}$ is a channel sampling value autocorrelation matrix, and $I_{LS}$ is a unit matrix, that is, only a matrix whose diagonal element is 1. The channel correlation matrix indicates a channel relationship between different REs, and may be used to estimate a channel estimation value corresponding to an unknown RE from a channel estimation value corresponding to a known RE. That is, for any two different REs in the 12 REs, for example, the channel correlation matrix may indicate a channel relationship between an RE multiplexed by the DMRS port 1 and the DMRS port 2 and an RE multiplexed by the DMRS port 3 and the DMRS port 4 in frequency domain, for example, a correlation matrix between RE0 and RE7 in FIG. 3. If the channel estimation value corresponding to one RE of any two different REs in the 12 REs is known, the channel estimation corresponding to the other RE of the two different REs can be estimated through the channel correlation matrix.

X=4 is used as an example. For the DMRS port 1 and the DMRS port 2 or the DMRS port 3 and the DMRS port 4, one RB includes six adjacent REs, and there are 24 adjacent REs in total. Therefore, a dimension of $H_{LS}$ is (24, 1), and a dimension of $I_{LS}$ is (24, 24); and a dimension of $R_{H_{LS}H_{LS}}$ is (24, 24), that is, $R_{H_{LS}H_{LS}}$ includes channel sampling values of 24 rows and 24 columns. X=4 is used as an example. One RB includes 12 REs, and there are 48 REs in total. Therefore, a dimension of $R_{HH_{LS}}$ is (48, 24), that is, $R_{HH_{LS}}$ includes elements of 48 rows and 24 columns; and a dimension of $\hat{H}$ is (48,1).

Generally, a same precoding processing is performed on the DMRS and the data. In this way, the terminal can obtain, on a time-frequency resource on which a DMRS port is located, an equivalent channel corresponding to the DMRS port through estimation based on a reference signal of the DMRS port predefined in a protocol. Currently, the base station sends a small quantity of DMRS port signals on a same time-frequency resource. As a result, the terminal obtains a small quantity of streams, and accuracy of a channel estimation result is low.

In view of this, an embodiment of this application provides a method for sending a DMRS. In the method, the network device can increase a quantity of multiplexed DMRS ports on a same time-frequency resource, that is, the network device sends more DMRS port signals on the same time-frequency resource. Because more DMRS ports may be multiplexed on the same time-frequency resource, the network device can send more streams without increasing reference signal overheads. For a terminal, because more streams are available, a more accurate channel estimation can be obtained.

The technical solutions provided in embodiments of this application may be applied to a 5G system, or applied to a future communication system or another similar communication system. In addition, the technical solutions provided in embodiments of this application may be applied to a cellular link, a PLMN network, a machine-to-machine (M2M) network, an Internet of Things (IoT) network, or another network. It can also be applied to a link between devices, for example, a device to device (D2D) link. The D2D link may also be referred to as a sidelink, and the sidelink may also be referred to as a sidelink, a secondary link, or the like. In embodiments of this application, the foregoing terms all refer to links established between devices of a same type, and have a same meaning. The link established between devices of a same type may be a link between terminal devices, a link between base stations, a link between relay nodes, or the like. This is not limited in embodiments of this application. For the link between the terminal devices, there is a D2D link defined in the third generation partnership project (3GPP) release (Rel)-12/13, and there is also a V2X link from vehicle to vehicle, or from vehicle to mobile phone, or from vehicle to any entity defined in the 3GPP for the Internet of Vehicles, which includes V2X links based on an NR system in Rel-14/15, Rel-16 that is currently being researched by the 3GPP, and a subsequent release.

Figure 4:
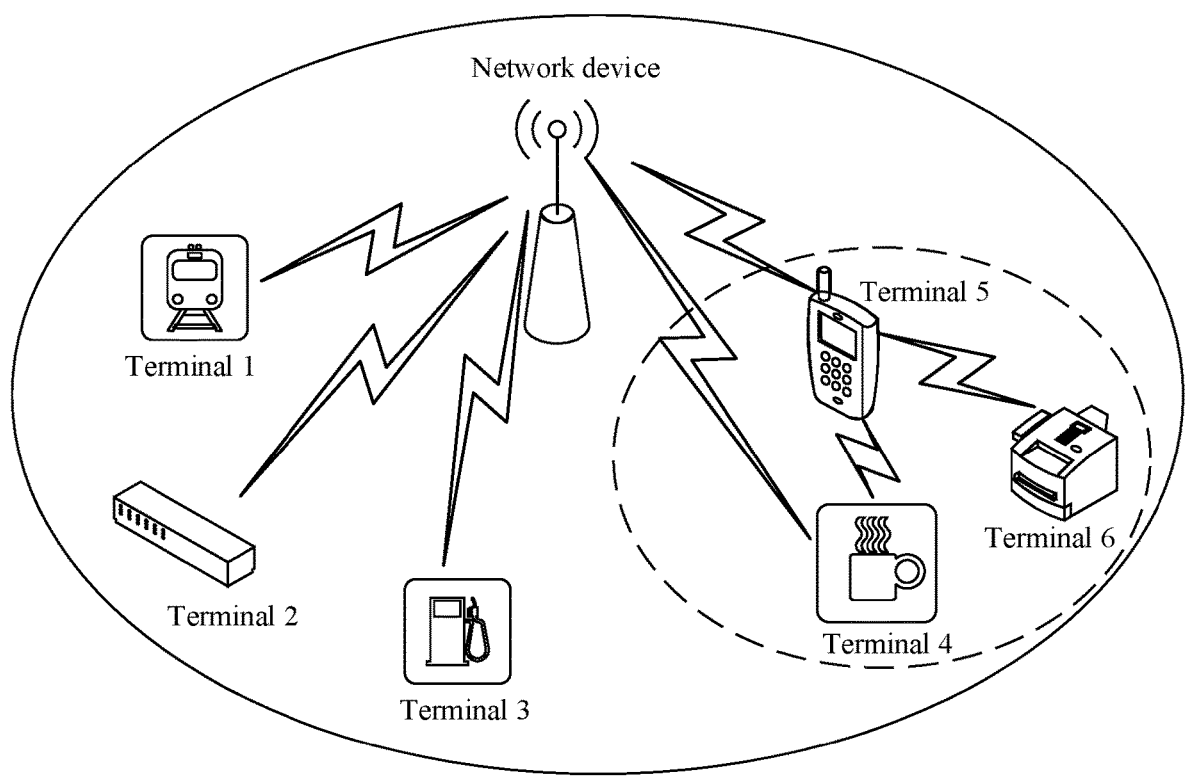
FIG. 4 is a schematic diagram of an architecture of a communication system to which an embodiment of this application is applicable.

FIG. 4 is an application scenario to which an embodiment of this application is applied, or a network architecture to which an embodiment of this application is applied. There are a network device and six terminals in FIG. 4. It should be understood that the quantity of terminals in FIG. 4 is merely an example, and there may be more or fewer terminals. The network architecture may further include other network devices, for example, may further include a wireless relay device and a wireless backhaul device, which are not shown in FIG. 4. The network device is an access device for a terminal to access a network using a wireless access network, and may be a base station. The network device corresponds to different devices in different systems. For example, the network device may correspond to an eNB in a 4th-generation (4G) mobile communication technology system, and may correspond to a gNB in a 5G system. The six terminals may be a cellular phone, a smartphone, a portable computer, a handheld communication device, a handheld computing device, a satellite radio apparatus, a global positioning system, a PDA, and/or any other suitable device configured to perform communication in a wireless communication system, and all may be connected to the network device.

Embodiments of this application may be applied to uplink signal transmission, downlink signal transmission, or D2D signal transmission. For downlink signal transmission, a sending device may be a network device, and a corresponding receiving device may be a terminal. For uplink signal transmission, a sending device may be a terminal, and a corresponding receiving device may be a network device. For D2D signal transmission, a sending device may be a terminal, and a receiving device may be also a terminal. For example, three terminals shown in a dashed-line region in FIG. 4 may be used in D2D signal transmission. A signal transmission direction is not limited in embodiments of this application.

For ease of understanding embodiments of this application, the following describes in detail a method for sending a DMRS signal and a method for receiving a DMRS signal provided in embodiments of this application with reference to the accompanying drawings. In the following descriptions, an example in which the method is applied to the communication system shown in FIG. 4 is used. In addition, the method may be performed by two communication apparatuses, and the two communication apparatuses are, for example, a first communication apparatus and a second communication apparatus. The first communication apparatus may be a network device or a communication apparatus that can support a network device in implementing a function required in the method, or may be a terminal or a communication apparatus that can support a terminal in implementing a function required in the method. Certainly, the first communication apparatus may alternatively be another communication apparatus, for example, a chip system. Similarly, the second communication apparatus may be a network device or a communication apparatus that can support a network device in implementing a function required in the method, or may be a terminal or a communication apparatus that can support a terminal in implementing a function required in the method. Certainly, the second communication apparatus may alternatively be another communication apparatus, for example, a chip system. In addition, implementations of both the first communication apparatus and the second communication apparatus are not limited. For example, the first communication apparatus is a network device, and the second communication apparatus is a terminal; both the first communication apparatus and the second communication apparatus are terminals; or the first communication apparatus is a network device, and the second communication apparatus is a communication apparatus that can support a terminal in implementing a required function of the method.

For ease of description, an example in which the method is performed by a network device and a terminal is used below, that is, an example in which the first communication apparatus is the terminal and the second communication apparatus is the network device is used. For example, the terminal in the following may be any one of the six terminals in FIG. 4, and the network device in the following may be the network device in FIG. 4. It should be noted that in embodiments of this application, only an example in which the base station and the terminal are used in the implementation is used, but is not limited to this scenario.

Figure 5:
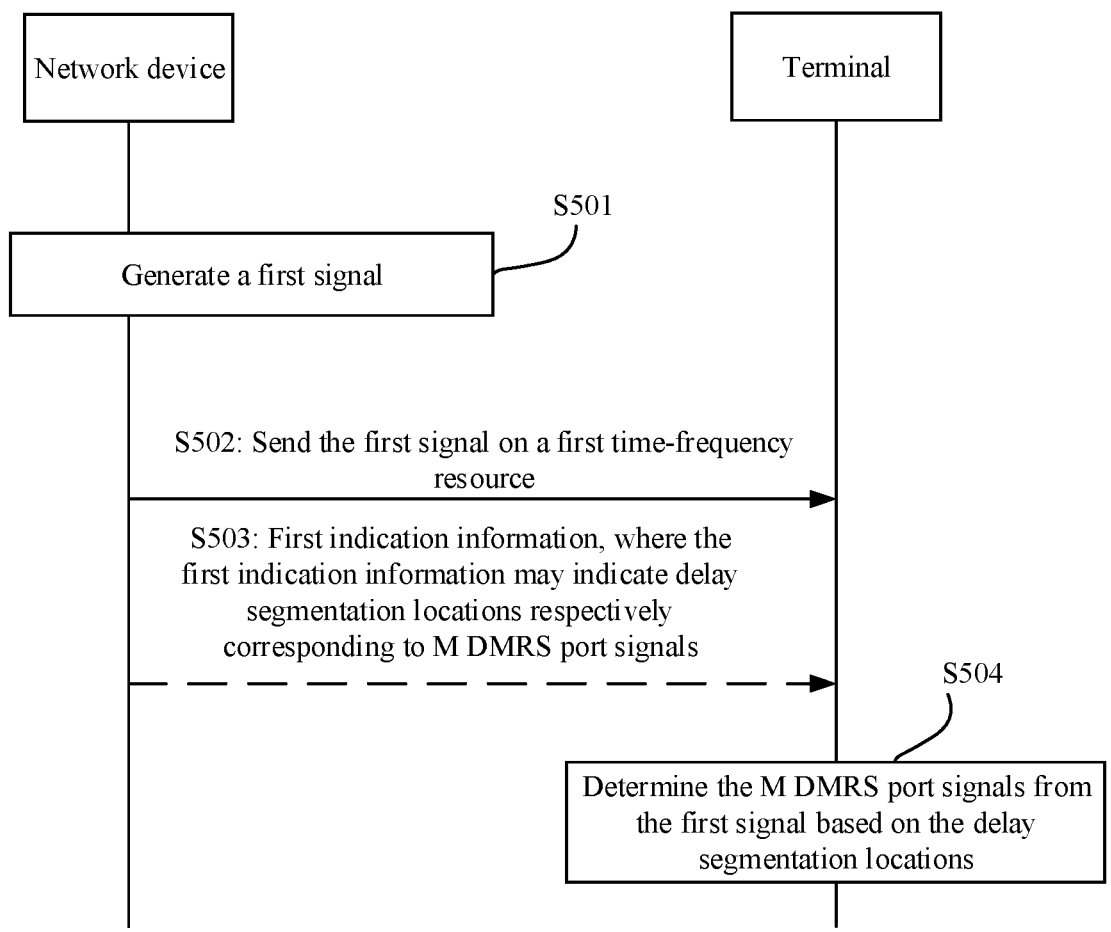
FIG. 5 is a schematic flowchart of a method for sending a DMRS and a method for receiving a DMRS according to an embodiment of this application.

FIG. 5 is a schematic flowchart of a method for sending a DMRS according to an embodiment of this application. A specific process of the method is described as follows.

S501: A network device generates a first signal.

The first signal is formed by superimposing M DMRS port signals, delay segmentation locations corresponding to at least two of the M DMRS port signals are different, and M is an integer greater than or equal to 2.

S502: The network device sends the first signal on a first time-frequency resource, and a corresponding terminal receives the first signal.

Generally, to assist in data demodulation, the network device sends a DMRS together with data. Because the DMRS is sent through a DMRS port, in some embodiments, the DMRS sent by the network device may be referred to as a DMRS port signal. It should be understood that the DMRS port is in a one-to-one correspondence with the DMRS port signal, that is, one DMRS port corresponds to one DMRS port signal.

In embodiments of this application, the network device can increase a quantity of multiplexed DMRS ports on a same time-frequency resource, that is, the network device sends a plurality of DMRS port signals on the same time-frequency resource. Because more DMRS ports may be multiplexed on the same time-frequency resource, the network device can send more streams without increasing reference signal overheads. For a terminal, because more streams are available, a more accurate channel estimation can be obtained.

In a possible implementation, before sending a DMRS port signal used for estimating a precoded equivalent channel by the terminal, the network device may filter the precoding. In a possible precoding filtering manner, phase rotation is performed on REs that are in a plurality of RBs within a PRB bundling size and that correspond to DMRS signals, and a frequency domain granularity for the phase rotation is 1RE, that is, each RE signal is multiplied by a complex number with a phase. It may be understood that some RE signals may be multiplied by 1, and finally no actual phase rotation occurs.

For example, if there are four RBs within the PRB bundling size, the network device needs to perform phase rotation on N=48 REs. It is assumed that channels of the N frequency domain units are respectively $H_1 \ldots H_N$, and precoding that is in a one-to-one correspondence with the channels of the N frequency domain units is respectively $P_1 \ldots P_N$. $P_1 \ldots P_N$ are located in a same precoding unit. Phase rotation on the N frequency domain units is respectively $e^{j\theta_1} \ldots e^{j\theta_N}$. After phase rotation, an equivalent channel received by the terminal is $H\theta$, where $H=[H_1P_1 \ldots H_NP_N]$ and $\theta =$ $$\begin{bmatrix} e^{j\theta_1} & \ldots & 0 \\ \vdots & \ddots & \vdots \\ 0 & \ldots & e^{j\theta_N} \end{bmatrix}.$$

As an example, the quantity of receive antennas of the terminal is 4. The network device performs phase rotation on the four RBs within the PRB bundling size, that is, performs phase rotation on each RE. The quantity of receive antennas of the terminal is 4. Because N=48, a dimension of H is 4*48, and a dimension of is Θ 48*48. It should be understood that when the equivalent channel received by the terminal is smooth in frequency domain and reaches a matching relationship with a Wiener filtering coefficient, channel estimation by the terminal is optimal. Therefore, the to-be-rotated phases of the N frequency domain units may be determined through the optimal channel estimation.

A smoothing criterion is set to $$\max_{\theta_1 \ldots \theta_N} \|H\Theta F\|_F^2,$$

where $F=[\alpha_1 f_1 \ldots \alpha_M f_M]$, $f_M$ is a discrete fourier transform (discrete fourier transform, DFT) basis vector, $[\alpha_1 \ldots a_M]$ is a weighting coefficient of the DFT basis vector and is determined based on a filtering coefficient, and M is a preset quantity of delay taps. A subscript F of $\|H\Theta F\|_F^2$ represents a norm, $$\max_{\theta_1 \ldots \theta_N} \|H\Theta F\|_F^2$$

may be considered as an optimized criterion expression to optimize θ, and it may be considered that an optimal θ maximizes a value of $\|H\Theta F\|_F^2$. The to-be-rotated phases of the N REs may be determined based on $$\max_{\theta_1 \ldots \theta_N} \|H\Theta F\|_F^2,$$

As an alternative solution, the smoothing criterion may be set to $$\max_{\theta} \theta^H C\theta,$$

where $$C = (F^T \odot H)^H (F^T \odot H), \theta = \text{diag}(\Theta) = \begin{bmatrix} e^{j\theta_1} \\ \vdots \\ e^{j\theta_N} \end{bmatrix}, F^T$$

$F^T$ represents a transpose of a matrix F, and $(F^T \odot H)^H$ represents a conjugate transpose of $F^T \odot H$. The symbol $\odot$ is a Khatri-Rao product, for example, $A \odot B = [a_1 \otimes b_i \ldots a_n \otimes b_n]$, $a_1$ is an $i^{th}$ column of A, $\otimes$ is a Kronecker product, $b_i$ is an $i^{th}$ column of B, and i is an integer greater than or equal to 0. The to-be-rotated phases of the N REs may be obtained by solving $$\max_{\theta} \theta^H C\theta,$$

As another example, the quantity of receive antennas of the terminal is 4. The network device jointly performs phase rotation on the four RBs in the PRB bundling size, that is, performs phase rotation on each RE, M=3, a dimension of H is 4*48, a dimension of $\Theta$ is 48*48, a dimension of F is 48*3, a dimension of $F^T \odot H$ is 12*48, and a dimension of C is 48*48.

Particularly, $$F = \begin{bmatrix} 1 \\ \vdots \\ 1 \end{bmatrix},$$

and only a direct current component is taken. The smoothing criterion may be simplified as $$\max_{\theta} \theta^H C\theta,$$

where $C = H^H H$, and singular value decomposition (SVD) may be directly performed on the matrix C. It is assumed that an eigenvector corresponding to a maximum eigenvalue is v, and a phase of an element at a corresponding location of v is taken for $\theta$, so that the to-be-rotated phases of the N frequency domain units may be obtained.

The network device performs phase rotation based on the to-be-rotated phases of the REs that are in the plurality of RBs in the PRB bundling size and that have the DMRS signals, that is, each RE in frequency domain is multiplied by a complex signal whose phase changes linearly, so that a signal in a corresponding delay domain may be displaced. Therefore, the network device performs phase rotation on the frequency domain units, so that the delay segmentation locations corresponding to at least two of a plurality of DMRS port signals sent by the network device may be different, and the terminal receives corresponding DMRS signals at different delay segmentation locations.

Figure 6:
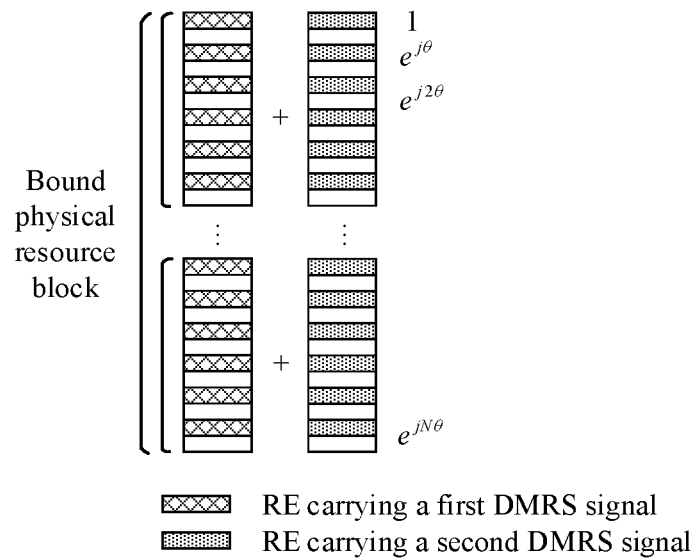
FIG. 6 is a schematic diagram of a principle of sending a DMRS according to an embodiment of this application.
Figure 7:
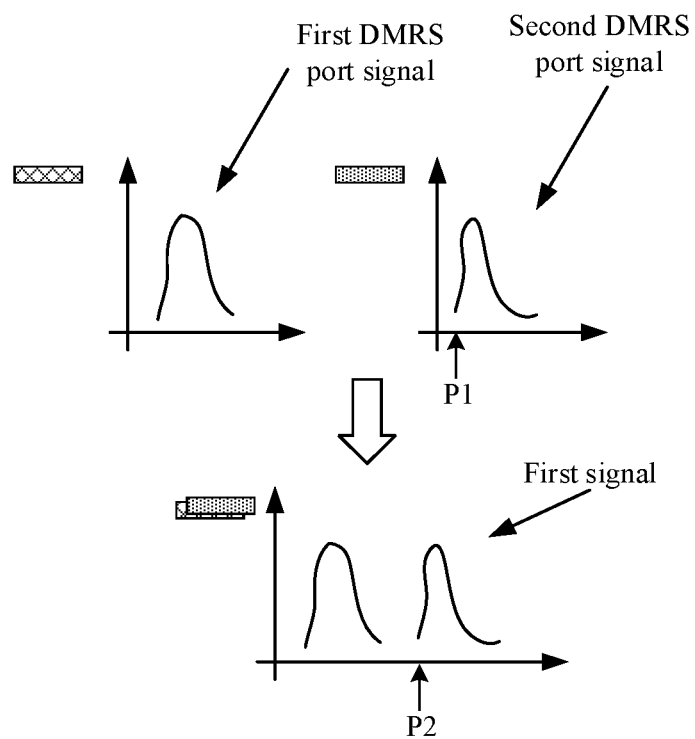
FIG. 7 is a schematic diagram of another principle of sending a DMRS according to an embodiment of this application.

FIG. 6 is a schematic diagram of a principle of sending a DMRS according to an embodiment of this application. FIG. 6 schematically shows a plurality of RBs. The quantity of RBs is not limited in this embodiment of this application. In FIG. 6, an example in which two DMRS port signals are superimposed is used. Shaded parts in FIG. 6 respectively represent REs that carry DMRS signals. One shaded part corresponds to a signal of a DMRS port (a first DMRS port signal is used as an example in this specification), and the other shaded part corresponds to a signal of another DMRS port (a second DMRS port signal is used as an example in this specification). It is assumed that a delay offset of the first DMRS port signal is 0. Before sending the second DMRS port signal, the network device may multiply each RE of the second DMRS port signal in frequency domain by a complex signal whose phase changes linearly. As shown in FIG. 6, a uniform phase difference exists between REs of the second DMRS port signal in frequency domain, so that the second DMRS port signal is displaced in a corresponding delay domain, that is, the second DMRS port signal is moved in the delay domain. As shown in FIG. 7, a start location of the second DMRS port signal in the delay domain is moved from a location P1 to a location P2. In this way, delay segmentation locations of the first DMRS port signal and the second DMRS port signal are different, as shown in FIG. 7. FIG. 7 is a schematic diagram of a delay domain of a first signal corresponding to FIG. 6. It can be seen from FIG. 7 that the delay segmentation locations of the first DMRS port signal and the second DMRS port signal are different.

For example, the network device sends M DMRS port signals, where M is an integer greater than or equal to 2. According to the method shown in FIG. 6, the network device can move different DMRS port signals to different locations in the delay domain, so that M DMRS ports may multiplex at a same time-frequency resource. The network device sends the M DMRS port signals, and can move some DMRS ports or all DMRS ports of the M DMRS port signals to different locations in the delay domain. The network device can send the M DMRS port signals on a same time-frequency resource (for example, a first time-frequency resource). The network device then superimposes the M DMRS port signals that are moved in the delay domain, to generate a first signal. The network device sends the first signal on the first time-frequency resource. That is, the network device can move signals of different DMRS ports to different locations in the delay domain, so that more DMRS ports can be multiplexed at the same time-frequency resource location. Because the delay offsets of at least two DMRS port signals in the first signal are different, the delay segmentation locations of the at least two DMRS port signals in the delay domain are also different. After receiving the first signal, the terminal can distinguish the DMRS port signals from the first signal based on the delay segmentation locations corresponding to the DMRS port signals. In other words, the terminal can receive the corresponding DMRS port signals at the delay segmentation locations respectively corresponding to the DMRS port signals. Then, the terminal device can perform time-domain filtering at a delay segmentation corresponding to each DMRS port signal, to obtain a receive channel corresponding to the DMRS port, and then perform channel estimation on the receive channel.

It should be noted that in embodiments of this application, different DMRS port signals correspond to different delay segmentation locations. For example, the M DMRS port signals are in a one-to-one correspondence with M delay segmentation locations, and any two adjacent delay segmentation locations in the M delay segmentation locations do not overlap. In this way, mutual interference between the DMRS port signals can be reduced. Alternatively, delay segmentation locations corresponding to different DMRS port signals may partially overlap, so that an effect of increasing a quantity of multiplexed DMRS ports is achieved when interference is within an allowed range.

It should be understood that the network device can adjust, based on an algorithm, a delay segmentation location corresponding to each DMRS port. If the terminal does not know a delay segmentation location corresponding to each DMRS port signal, the terminal cannot distinguish each DMRS port signal in the first signal, that is, cannot receive a corresponding DMRS port signal at a delay segmentation location corresponding to each DMRS port signal. Therefore, the terminal can obtain a delay segmentation location based on a preset relationship, or the network device can notify the terminal of the delay segmentation locations respectively corresponding to the M DMRS port signals in the first signal. It may be understood that the method in this embodiment in FIG. 5 may further include the following steps.

S503: The network device sends first indication information to the terminal, and correspondingly, the terminal receives the first indication information, where the first indication information indicates the delay segmentation locations respectively corresponding to the M DMRS port signals.

S504: The terminal determines the M DMRS port signals in the first signal based on the delay segmentation locations.

After determining the delay segmentation locations corresponding to the M DMRS port signals, the network device can generate first indication information. The first indication information may indicate the M delay segmentation locations. The network device sends the first indication information to the terminal, to notify the terminal of the delay segmentation locations.

The first indication information may be carried in one or more fields of existing signaling, which will be compatible with the existing signaling. For example, the first indication information is carried in one or more of radio resource control (RRC) signaling, media access control control element (MAC CE) signaling, downlink control information (DCI) signaling, and the like. The one or more fields may be fields defined in the RRC signaling, fields defined in the MAC CE signaling, or fields defined in the DCI signaling, or may be newly defined RRC fields, MAC CE fields, or DCI fields. This is not limited in embodiments of this application. For example, in some embodiments, the first indication information may alternatively be carried in newly defined signaling.

In embodiments of this application, the first indication information may indicate the delay segmentation locations respectively corresponding to the M DMRS port signals. For example, the first indication information includes information about M delay segmentation locations. Alternatively, the first indication information may indirectly indicate the delay segmentation locations respectively corresponding to the M DMRS port signals. For example, the first indication information may include related information of the M delay segmentation locations, and the M delay segmentation locations may be indirectly indicated by using the related information, to reduce indication overheads to some extent. The following describes several possible implementations of the first indication information.

Indication manner 1: The network device may indicate a plurality of delay segmentation locations by using a plurality of fields in the first indication information, where each field independently indicates one delay segmentation location. Specifically, the first indication information includes M fields, where each of the M fields indicates one delay segmentation location, that is, the M fields indicate M delay segmentation locations.

As an example, a delay segmentation location corresponding to each DMRS port may be predefined. For example, N delay segmentation locations may be predefined, and the N delay segmentation locations are sorted. Each of the M fields may indicate one of the N delay segmentation locations. It should be noted that a value of N is not limited in embodiments of this application, and N and M may be the same or may be different. Optionally, N may be determined based on a delay distribution of the terminal and a guard interval of an orthogonal frequency division multiplexing (OFDM) symbol.

For example, each of the M fields may occupy N bits, and the M fields occupy M*N bits in total. Each of the N bits of each field corresponds to one delay segmentation location, and a value of each field indicates that a corresponding delay segmentation location is a specific delay segmentation location in the N delay segmentation locations. For example, N=8 and M=2 are used as an example. It may be defined that a value "0" of each bit indicates that a corresponding delay segmentation location is selected. On the contrary, a value "1" of the bit indicates that no corresponding delay segmentation location is selected. The first indication information may include two fields, and the two fields are respectively referred to as a first field and a second field. The first field may occupy eight bits, and the second field may occupy eight bits. If a value carried by the first field is "11110111", and a value carried by the second field is "11111011", it indicates that two delay segmentation locations are the fifth delay segmentation location and the sixth delay segmentation location in eight delay segmentation locations. It can be learned that in this indication manner, each field clearly indicates a specific delay segmentation location in the N delay segmentation locations, which is straightforward. It should be noted that in this example, a value "0" of each bit indicates that a corresponding delay segmentation location is selected, and a value "1" of the bit indicates that no corresponding delay segmentation location is selected. In some other examples, it may also be specified that a value "1" of each bit indicates that a corresponding delay segmentation location is selected. A value "0" of the bit indicates that no corresponding delay segmentation location is selected.

For example, each of the M fields may occupy N bits, and the M fields occupy M*N bits in total. Each of $\log_2 N$ bits of each field corresponds to one delay segmentation location, and a value of each field indicates that a corresponding delay segmentation location is a specific delay segmentation location in the N delay segmentation locations. For example, N=8 and M=2 are used as an example. The first indication information may include two fields, and the two fields are respectively referred to as a first field and a second field. The first field may occupy three bits, and the second field may occupy three bits. If a value carried by the first field is "101", and a value carried by the second field is "011", it indicates that two delay segmentation locations are the sixth delay segmentation location and the fourth delay segmentation location in the eight delay segmentation locations. This indication manner is direct, and more signaling overheads are reduced.

Indication manner 2: The network device may jointly indicate, by using one or more fields in the first indication information, the delay segmentation locations respectively corresponding to the M DMRS port signals.

As an example, the first indication information may include a field (for example, a first field), where the first field indicates the delay segmentation locations respectively corresponding to the M DMRS port signals. In other words, the first field may indicate the M delay segmentation locations.

For example, N delay segmentation locations may be predefined, and the N delay segmentation locations are sorted. The first field may occupy N bits, where each bit corresponds to one delay segmentation location, and a value of each bit indicates whether a corresponding delay segmentation location is selected. For example, it may be defined that a value "0" of each bit indicates that a corresponding delay segmentation location is selected. On the contrary, a value "1" of the bit indicates that no corresponding delay segmentation location is selected. A value of the first field may also indicate M delay segmentation locations. For example, N=8 and M=2 are used as an example. If the value of the first field is "11110011", it indicates that two delay segmentation locations are the fifth delay segmentation location and the sixth delay segmentation location in eight delay segmentation locations. It can be learned that compared with the manner in which the plurality of fields indicate the M delay segmentation locations, the first field indicates the M delay segmentation locations, to further reduce the signaling overheads. In addition, the first field may directly indicate the M delay segmentation locations in the N delay segmentation locations, which is straightforward.

For example, N delay segmentation locations may be predefined, and the N delay segmentation locations are sorted. The first field may indicate M delay segmentation locations selected from the N delay segmentation locations. It should be understood that there are CN combinations for selecting the M delay segmentation locations from the N delay segmentation locations. The first field may indicate one of the CN combinations, to indirectly indicate the M delay segmentation locations.

For example, N=8 and M=2 are used as an example. Two delay segmentation locations are selected from eight delay segmentation locations, and there are 28 possible combinations, as shown in Table 1. The first field may occupy five bits, and a value of the first field indicates a specific combination in the 28 combinations, that is, two specific delay segmentation locations in the eight delay segmentation locations. For example, a value carried by the five bits of the first field is "00111", that is, the first field indicates two delay segmentation locations included in the eighth combination of the 28 combinations. In this manner, the quantity of bits occupied by the first field may be $\lceil \log_2 C(N,M) \rceil$, that is, the quantity of bits occupied by the first field is smaller, so that the signaling overheads can be further reduced.

TABLE 1

| Values of bits | Combination | Sequence number of a combination. |
|---|---|---|
| 00000 | Delay segmentation location 1 and delay segmentation location 2 | 0 |
| 00001 | Delay segmentation location 1 and delay segmentation location 3 | 2 |
| ... | ... | ... |
| 11011 | Delay segmentation location 8 and delay segmentation location 7 | 27 |
| 11111 | Reserved | Reserved |

One or more fields in the first indication information jointly indicate the M delay segmentation locations. Although the terminal can determine the M delay segmentation locations based on the first indication information, the terminal does not know how the M delay segmentation locations correspond to the M DMRS port signals. Therefore, a correspondence (which is referred to as a first correspondence below) between the DMRS ports included in the network device and the N delay segmentation locations may be predefined. The delay segmentation locations corresponding to different DMRS ports may be the same, that is, a plurality of DMRS ports may correspond to one delay segmentation location. Because the DMRS port signals are in a one-to-one correspondence with the DMRS ports, a delay segmentation location corresponding to a DMRS port is also the delay segmentation location corresponding to the DMRS port signal corresponding to the DMRS port. The N delay segmentation locations may be sorted in advance. For example, the N delay segmentation locations are respectively numbered and sorted in ascending (or descending) order of numbers. In this way, after receiving the first indication information and obtaining the M delay segmentation locations, the terminal can determine, based on the first correspondence, delay segmentation locations respectively corresponding to DMRS port signals, and perform channel estimation filtering on a received DMRS port signal at a corresponding delay segmentation location.

Indication manner 3: The M delay segmentation locations may be implicitly (indirectly) indicated by using port numbers of DMRS ports. The M DMRS port signals are in a one-to-one correspondence with the M DMRS ports, and the M DMRS port signals are also in a one-to-one correspondence with the M delay segmentation locations. Therefore, the M delay segmentation locations are in a one-to-one correspondence with the M DMRS ports, and the delay segmentation locations may be indirectly indicated by using the port numbers of the DMRS ports. In this manner, the network device does not need to send the first indication information to the terminal, to further reduce the signaling overheads. Therefore, S503 is not necessary, that is, is an optional step, and is shown by using a dashed line in FIG. 5.

As an example, a system may predefine a delay segmentation location corresponding to each DMRS port of the network device. For example, port numbers of DMRS ports respectively corresponding to different delay segmentation locations may be predefined, that is, a correspondence, that is, a first correspondence, between the port numbers of the DMRS ports and the delay segmentation locations may be predefined, as shown in Table 2. The network device can allocate a port number to each DMRS port, the network device may indicate the port number to the terminal, and the terminal receives the M DMRS port signals through DMRS ports corresponding to the port numbers indicated by the network device. Because the terminal has the information which signals are received from which DMRS ports, the terminal can determine, based on the port numbers indicated by the network device and the first correspondence, the delay segmentation locations respectively corresponding to the M DMRS port signals.

TABLE 2

First correspondence

| Port numbers of DMRS ports | Sequence numbers of delay segmentation locations |
| --- | --- |
| 0 | 0 |
| 1 | 1 |
| ... | ... |
| N | N |

It should be noted that Table 2 is merely an example. A specific mapping relationship between the sequence numbers of the delay segmentation locations and the port numbers of the DMRS ports is not limited in embodiments of this application.

In the foregoing technical solution, the first indication information may indicate, to one terminal, the M delay segmentation locations corresponding to the M DMRS port signals. One DMRS port may be used by any terminal. Corresponding to different terminals, delay segmentation locations corresponding to the DMRS port may be the same or may be different. If it is pre-agreed that delay segmentation locations corresponding to a same DMRS port of a plurality of terminals are the same, that is, one DMRS port corresponds to one delay segmentation location, in this case, optionally, the foregoing implicit indication manner or the first indication information may be used to indicate the M delay segmentation locations to the terminal.

For a plurality of terminals, if the delay segmentation locations corresponding to a same DMRS port are different, the terminals do not have the information of the delay segmentation location corresponding to the DMRS port. As a result, the terminal cannot accurately perform filtering at a corresponding delay segmentation location. Therefore, in some embodiments of this application, optionally, the network device can notify the terminal or agree beforehand on whether delay segmentation locations corresponding to any DMRS port are the same for all terminals, or notify each terminal of a delay segmentation location corresponding to the terminal, so that the terminal accurately performs filtering at a corresponding delay segmentation location.

It should be understood that, to reduce pilot overheads, when performing DMRS channel estimation, the terminal can uniformly perform filtering processing on a plurality of RBs, that is, bind a plurality of RBs into one PRG, and perform filtering processing on the PRG, so as to reduce noise and improve a channel estimation effect. In embodiments of this application, delay segmentation locations corresponding to different PRGs may be the same or different.

For example, in some embodiments, for any DMRS port of at least one of the M DMRS ports, delay segmentation locations corresponding to all PRGs associated with the DMRS port are allowed to be the same. If delay segmentation locations corresponding to all PRGs associated with one DMRS port are the same, that is, all PRGs associated with one DMRS port correspond to one delay segmentation location, in this case, the first indication information is applicable to all the PRGs. The network device may indicate, through the first indication information, that is, the M delay segmentation locations to the terminal, that is, a delay segmentation location corresponding to one DMRS port may be indicated by using one piece of signaling, and signaling overheads are low. The terminal does not need to a size of the PRG, and can distinguish the DMRS port signals from the first signal based on only the first indication information.

In some other embodiments, for any one of at least one of the M DMRS ports, the delay segmentation locations corresponding to at least two of all PRGs associated with the DMRS port can be different. If different PRGs in all PRGs associated with one DMRS port correspond to different delay segmentation locations, the terminal needs t the M delay segmentation locations that correspond to specific PRGs. In this case, the specific PRGs corresponding to the M delay segmentation locations need to be additionally indicated.

As an example, the delay segmentation locations corresponding to at least two PRGs in the delay segmentation locations corresponding to all PRGs associated with one DMRS port are different. In this case, in the PRGs associated with one DMRS port, the PRGs corresponding to a same delay segmentation location may be considered as one group, and the PRGs in different groups correspond to different delay segmentation locations. For each PRG, the network device may indicate a delay segmentation location. For example, the first indication information may further include a third field, and the third field indicates a PRG. The terminal receives the first indication information, and can determine, based on the third field, that the M delay segmentation locations correspond to specific PRGs.

It should be understood that, if delay segmentation locations corresponding to different PRGs in the PRGs associated with one DMRS port are different, each PRG associated with one DMRS port may be indicated by using the first indication information. The fourth fields included in different first indication information indicate different corresponding PRGs. The terminal receives the first indication information, and can determine, based on the fourth fields, that the M delay segmentation locations correspond to specific PRGs. It should be understood that overheads of the fourth field vary with different quantities of delay segmentation locations corresponding to DMRS ports corresponding to PRGs. To ensure that the terminal correctly parses the first indication information, in this embodiment of this application, a correspondence between a size of a PRG associated with any DMRS port and a quantity of delay segmentation locations corresponding to the DMRS port may be defined. It may also be considered that there is a second correspondence between a PRG associated with any DMRS port and a quantity of delay segmentation locations corresponding to the DMRS port. Signaling overheads of the first indication information can be determined based on the second correspondence, so that the terminal can correctly parse the first indication information based on the second correspondence.

Similarly, delay segmentation locations corresponding to a same PRB bundling size may be the same or may be different. If the delay segmentation locations corresponding to the same PRB bundling size are different, a specific PRB bundling size corresponding to the M delay segmentation locations needs to be additionally indicated. For example, the first indication information may include a fifth field, and the fifth field indicates the PRB bundling size corresponding to the M delay segmentation locations. It should be understood that the overheads of the fifth field vary with different quantities of delay segmentation locations corresponding to DMRS ports corresponding to the PRB bundling size. To ensure that the terminal correctly parses the first indication information, in this embodiment of this application, a correspondence between a plurality of PRB bundling sizes and a quantity of delay segmentation locations corresponding to a DMRS port may be defined. Signaling overheads of the first indication information can be determined based on the correspondence, so that the terminal can correctly parse the first indication information based on the correspondence.

It should be understood that the terminal distinguishes the different DMRS port signals in the first signal, for example, the first DMRS port signal and the second DMRS port signal, performs filtering and interpolation processing on the first DMRS port signal at a first delay segmentation corresponding to the first DMRS port signal, and performs filtering and interpolation processing on the second DMRS port signal at a second delay segmentation corresponding to the second DMRS port signal.

Generally, a larger PRG indicates a lower density of a frequency-domain reference signal of a DMRS port in a frequency domain. In some embodiments of this application, a correspondence between a size of a PRG associated with a DMRS port and a frequency-domain reference signal density of the DMRS port may be defined. It may also be considered that there is a third correspondence between a size of a PRG associated with a DMRS port and a frequency-domain reference signal density of the DMRS port.

In an example, the third correspondence may be predefined, and it is specified that the terminal uses a preset PRG. In this case, without an indication of the network device, the terminal can determine, based on the preset PRG and the third correspondence, frequency-domain reference signal density of a DMRS port to be selected, and then perform filtering and interpolation processing on a received DMRS port signal based on the frequency-domain reference signal density of the DMRS port.

Alternatively, the network device may send second indication information to the terminal, where the second indication information may indicate a PRG to be selected by the terminal. The terminal can determine the frequency-domain reference signal density of a DMRS port based on the PRG and a preset third correspondence. Alternatively, the network device may send second indication information to the terminal, where the second indication information may indicate a PRG to be selected by the terminal and the third correspondence. The terminal can determine, based on the second indication information, the frequency-domain reference signal density of a DMRS port that needs to be selected.

Similarly, in this embodiment of this application, a correspondence, for example, a fourth correspondence, between a plurality of PRB bundling sizes and a frequency-domain reference signal density may be defined, so that the frequency-domain reference signal density of a DMRS port to be selected by the terminal is indicated by using the fourth correspondence.

For example, the fourth correspondence may be predefined and a used PRB bundling size may be preset. In this case, without an indication of the network device, the terminal can determine, based on the preset PRB bundling size and the fourth correspondence, frequency-domain reference signal density of a DMRS port that needs to be selected, and then perform filtering and interpolation processing on a received DMRS port signal based on the frequency-domain reference signal density of the DMRS port.

Alternatively, the network device may send third indication information to the terminal, where the third indication information may indicate a PRB bundling size to be selected by the terminal. The terminal can determine the frequency-domain reference signal density of a DMRS port based on the PRB bundling size and the preset fourth correspondence. In this way, filtering and interpolation processing are performed on a received DMRS port signal based on the frequency-domain reference signal density of the DMRS port. Alternatively, the network device may send third indication information to the terminal, where the third indication information may indicate a PRB bundling size to be selected by the terminal and a fourth correspondence. The terminal can determine, based on the third indication information, frequency-domain reference signal density of a DMRS port that needs to be selected.

It should be noted that the second indication information may be carried in one or more fields of existing signaling. For example, the second indication information is carried in one or more of RRC signaling, MAC CE signaling, DCI signaling, and the like. The one or more fields may be fields defined in the RRC signaling, fields defined in the MAC CE signaling, or fields defined in the DCI signaling, or may be newly defined RRC fields, MAC CE fields, or DCI fields. This is not limited in embodiments of this application. For example, in some embodiments, the second indication information may alternatively be carried in newly defined signaling.

The third indication information may be carried in one or more fields of existing signaling. For example, the third indication information is carried in one or more of RRC signaling, MAC CE signaling, DCI signaling, and the like. The one or more fields may be fields defined in the RRC signaling, fields defined in the MAC CE signaling, or fields defined in the DCI signaling, or may be newly defined RRC fields, MAC CE fields, or DCI fields. This is not limited in embodiments of this application. For example, in some embodiments, the third indication information may alternatively be carried in newly defined signaling.

According to the method for sending a DMRS provided in embodiments of this application, a network device can increase the quantity of multiplexed DMRS ports on a same time-frequency resource based on different delay segmentation locations corresponding to at least two DMRS port signals, that is, the network device sends more DMRS port signals on the same time-frequency resource. Because more DMRS ports may be multiplexed on the same time-frequency resource, the network device can send more streams without increasing pilot overheads. For a terminal, because more streams are available, a more accurate channel estimation can be achieved.

The foregoing embodiments of this application describe the method provided in embodiments of this application from a perspective of interaction between the terminal and the network device. To implement functions in the foregoing methods provided in embodiments of this application, the terminal and the network device may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The following describes communication apparatuses for implementing the foregoing methods in embodiments of this application with reference to the accompanying drawings. Therefore, all the foregoing content may be used in the following embodiments. Repeated content is not described again.

Figure 8:
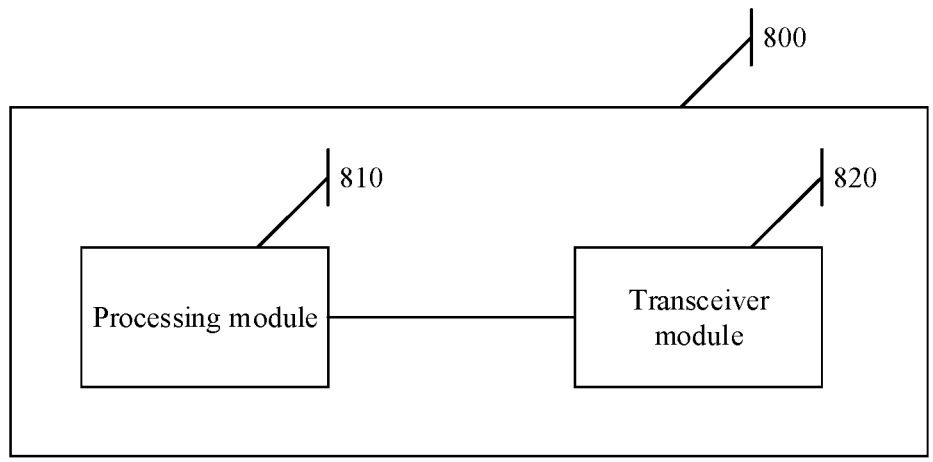
FIG. 8 is a schematic diagram of a structure of a communication apparatus according to an embodiment of this application.

FIG. 8 is a schematic block diagram of a communication apparatus 800 according to an embodiment of this application. The communication apparatus 800 may correspondingly implement functions or steps implemented by the terminal or the base station in the foregoing method embodiments. The communication apparatus may include a processing module 810 (for example, a processor or processing circuit) and a transceiver module 820 (for example, a transceiver circuit). Optionally, the communication apparatus may further include a storage unit. The storage unit may be configured to store instructions (code or a program) and/or data. The processing module 810 and the transceiver module 820 may be coupled to the storage unit. For example, the processing module 810 may read the instructions (the code or the program) and/or the data in the storage unit, to implement a corresponding method. The foregoing units may be disposed independently, or may be partially or completely integrated.

In some possible implementations, the communication apparatus 800 can correspondingly implement behavior and functions of the base station in the foregoing method embodiments. For example, the communication apparatus 800 may be a base station, or may be a component (for example, a chip or a circuit) used in a base station. The transceiver module 820 may be configured to perform all receiving or sending operations performed by the base station in the embodiment shown in FIG. 5, for example, S502 and S503 in the embodiment shown in FIG. 5, and/or another process used to support the technology described in this specification. The processing module 810 is configured to perform all operations, except the sending and receiving operations, performed by the base station in the embodiment shown in FIG. 5, for example, S501 in the embodiment shown in FIG. 5, and/or another process used to support the technology described in this specification.

As an example, the processing module 810 is configured to generate a first signal, where the first signal is formed by superimposing M DMRS port signals, delay segmentation locations corresponding to at least two of the M DMRS port signals are different, and M is an integer greater than or equal to 2; and the transceiver module 820 is configured to send the first signal on a first time-frequency resource.

As an optional implementation, the transceiver module 820 is further configured to send indication information, where the indication information indicates the delay segmentation locations respectively corresponding to the M DMRS port signals.

As an optional implementation, there is a first correspondence between M DMRS ports corresponding to the M DMRS port signals and the delay segmentation locations.

As an optional implementation, there is at least one DMRS port in the M DMRS ports corresponding to the M DMRS port signals, and for any one of the at least one DMRS port, delay segmentation locations corresponding to the PRGs associated with the DMRS port are the same; or
there is at least one DMRS port in the M DMRS ports corresponding to the M DMRS port signals, and for any one of the at least one DMRS port, delay segmentation locations corresponding to at least two of all PRGs associated with the DMRS port are different.

As an optional implementation, there is a second correspondence between a size of a PRG associated with any DMRS port and a quantity of delay segmentation locations corresponding to the DMRS port.

As an optional implementation, there is a third correspondence between a size of a PRG associated with any DMRS port and a frequency-domain reference signal density of the DMRS port.

As an optional implementation, the indication information occupies L bits, and
the L bits jointly indicate M delay segmentation locations, and L is an integer greater than or equal to 1; or
the L bits respectively indicate M delay segmentation locations, and L is equal to M.

It should be understood that, in some embodiments of this application, the processing module 810 may be implemented as a processor or a processor-related circuit component, and the transceiver module 820 may be implemented as a transceiver or a transceiver-related circuit component or a communication interface.

In some possible implementations, the communication apparatus 800 can correspondingly implement behavior and functions of the terminal in the foregoing method embodiments. For example, the communication apparatus 800 may be a terminal, or may be a component (for example, a chip or a circuit) used in a terminal. The transceiver module 820 may be configured to perform all receiving or sending operations performed by the terminal in the embodiment shown in FIG. 5, for example, S502 and S503 in the embodiment shown in FIG. 5, and/or another process used to support the technology described in this specification. The processing module 810 is configured to perform all operations, except the sending and receiving operations, performed by the terminal in the embodiment shown in FIG. 5, for example, S504 in the embodiment shown in FIG. 5, and/or another process used to support the technology described in this specification.

As an example, the transceiver module 820 is configured to receive a first signal on a first time-frequency resource, where the first signal is formed by superimposing M DMRS port signals, the delay segmentation locations corresponding to at least two of the M DMRS port signals are different, and M is an integer greater than or equal to 2; and the processing module 810 is configured to determine the M DMRS port signals from the first signal based on the delay segmentation locations.

As an optional implementation, the transceiver module 820 is further configured to send indication information, where the indication information indicates the delay segmentation locations respectively corresponding to the M DMRS port signals.

As an optional implementation, there is a first correspondence between M DMRS ports corresponding to the M DMRS port signals and the delay segmentation locations.

As an optional implementation, there is at least one DMRS port in the M DMRS ports corresponding to the M DMRS port signals, and for any one of the at least one DMRS port, the delay segmentation locations corresponding to all PRGs associated with the DMRS port are the same; or
there is at least one DMRS port in the M DMRS ports corresponding to the M DMRS port signals, and for any one of the at least one DMRS port, the delay segmentation locations corresponding to at least two of the PRGs associated with the DMRS port are different.

As an optional implementation, there is a second correspondence between a size of a PRG associated with a DMRS port and a quantity of the delay segmentation locations corresponding to the DMRS port.

As an optional implementation, there is a third correspondence between a size of a PRG associated with a DMRS port and a frequency-domain reference signal density of the DMRS port.

As an optional implementation, the indication information occupies L bits, and
- the L bits jointly indicate M delay segmentation locations, and L is an integer greater than or equal to 1; or
- the L bits respectively indicate M delay segmentation locations, and L is equal to M.

It should be understood that, in some embodiments of this application, the processing module 810 may be implemented as a processor or a processor-related circuit component, and the transceiver module 820 may be implemented as a transceiver or a transceiver-related circuit component or a communication interface.

Figure 9:
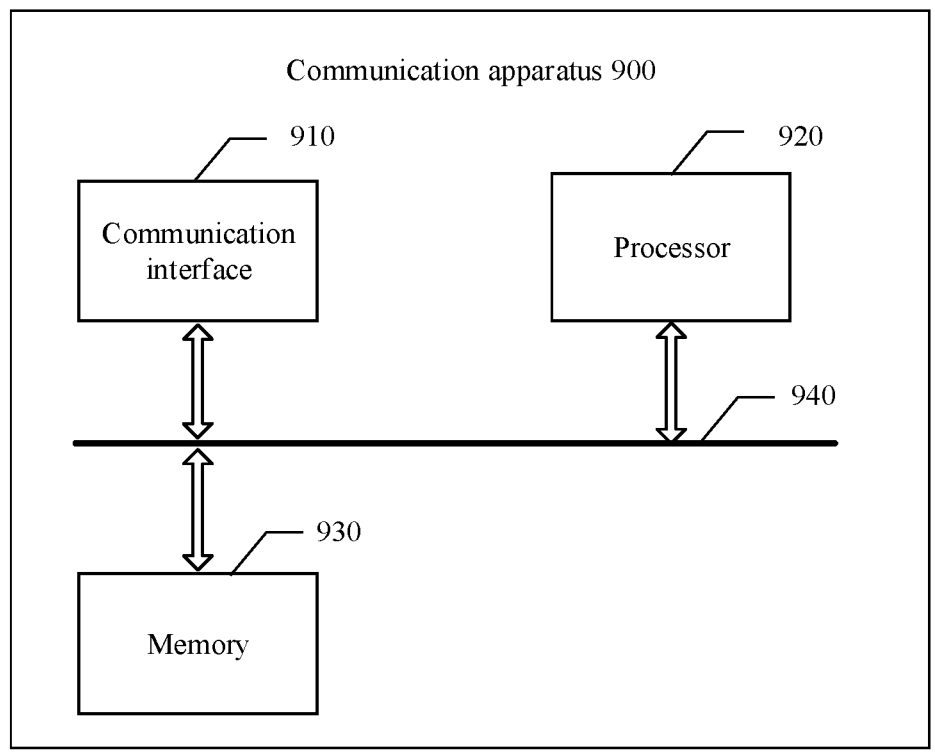
FIG. 9 is a schematic diagram of another structure of a communication apparatus according to an embodiment of this application.

FIG. 9 shows a communication apparatus 900 according to an embodiment of this application. The communication apparatus 900 may be a terminal, and can implement functions of the terminal in the method provided in embodiments of this application. Alternatively, the communication apparatus 900 may be a network device, and can implement functions of the network device in the method provided in embodiments of this application. Alternatively, the communication apparatus 900 may be an apparatus that can support the terminal in implementing corresponding functions in the method provided in embodiments of this application, or an apparatus that can support the network device in implementing corresponding functions in the method provided in embodiments of this application. The communication apparatus 900 may be a chip or a chip system. In this embodiment of this application, the chip system may include a chip, or may include a chip and another discrete component.

In terms of hardware implementation, the transceiver module 820 may be a transceiver, and the transceiver is integrated into the communication apparatus 900 to form a communication interface 910.

The communication apparatus 900 includes at least one processor 920, configured to implement or support the communication apparatus 900 in implementing the functions of the network device or the terminal in the method provided in embodiments of this application. For details, refer to detailed descriptions in the method example. Details are not described herein again.

The communication apparatus 900 may further include at least one memory 930, configured to store program instructions and/or data. The memory 930 is coupled to the processor 920. The coupling in this embodiment of this application may be an indirect coupling or a communication connection between apparatuses, units, or modules in an electrical form, a mechanical form, or another form, and is used for information exchange between the apparatuses, the units, or the modules. The processor 920 may operate in collaboration with the memory 930. The processor 920 may execute the program instructions and/or the data stored in the memory 930, so that the communication apparatus 900 implements a corresponding method. At least one of the at least one memory may be included in the processor.

The communication apparatus 900 may further include a communication interface 910, configured to communicate with another device through a transmission medium, so that an apparatus in the communication apparatus 900 can communicate with the other device. For example, when the communication apparatus is a terminal, the other device is a network device. Alternatively, when the communication apparatus is a network device, the another device is a terminal. The processor 920 may send and receive data through the communication interface 910. The communication interface 910 may be specifically a transceiver.

This embodiment of this application does not limit a specific connection medium between the communication interface 910, the processor 920, and the memory 930. In this embodiment of this application, in FIG. 9, the memory 930, the processor 920, and the communication interface 910 are connected through a bus 940, and the bus is represented by using a bold line in FIG. 9. A connection manner between other components is merely an example for description, and imposes no limitation. The bus may be classified into an address bus, a data bus, a control bus, and the like. For ease of representation, only one bold line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 930 may be a non-volatile memory such as a hard disk drive (HDD) or a solid-state drive (SSD), or may be a volatile memory such as a random-access memory (random-access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be noted that the communication apparatus in the foregoing embodiments may be a terminal, a circuit, a chip used in a terminal, or another combined component, component, or the like that has a function of the terminal. When the communication apparatus is a terminal, the transceiver module may be a transceiver, and may include an antenna, a radio frequency circuit, and the like. The processing module may be a processor, for example, a central processing unit (CPU). When the communication apparatus is a component that has a function of the terminal, the transceiver module may be a radio frequency unit, and the processing module may be a processor. When the communication apparatus is a chip or a chip system, the transceiver module may be an input/output interface of the chip or the chip system, and the processing module may be a processor of the chip or the chip system.

Figure 10:
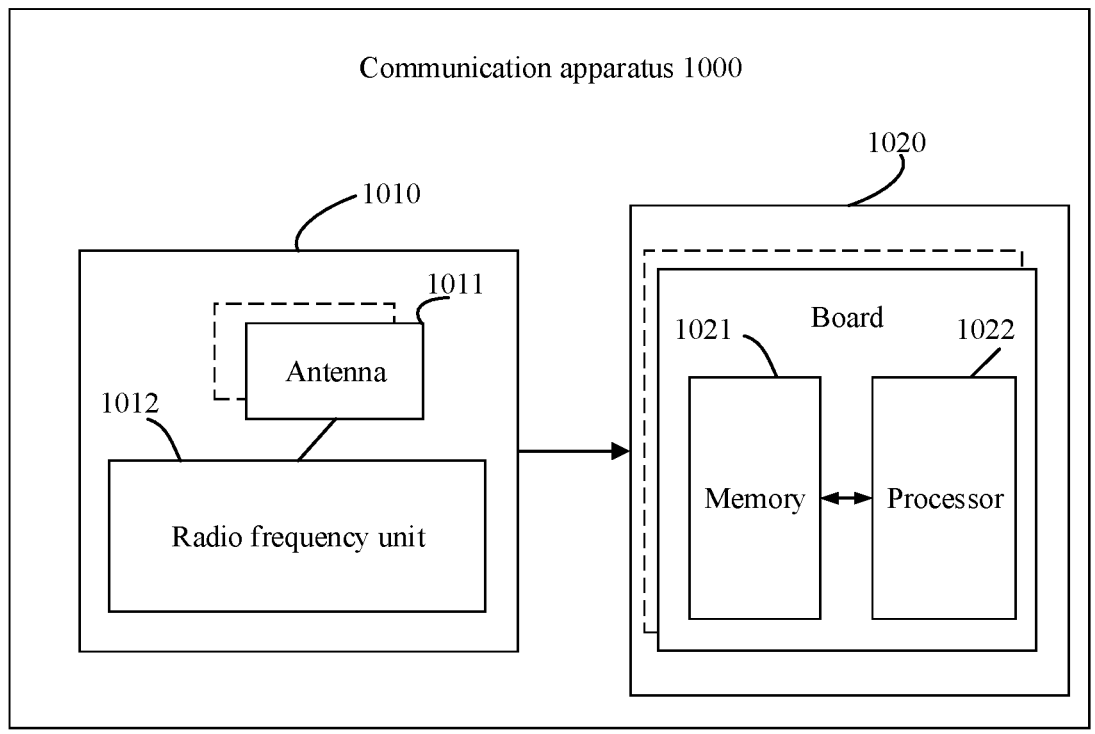
FIG. 10 is a schematic diagram of a structure of a communication apparatus according to an embodiment of this application.

FIG. 10 is a schematic diagram of a simplified structure of a communication apparatus. For ease of understanding and illustration, in FIG. 10, an example in which the communication apparatus is a base station is used. The base station may be used in the system shown in FIG. 4, may be the network device in FIG. 4, and performs functions of the network device in the method embodiments.

The communication apparatus 1000 may include a transceiver 1010, a memory 1021, and a processor 1022. The transceiver 1010 may be configured to perform communication by the communication apparatus, for example, configured to send or receive the indication information and the like. The memory 1021 is coupled to the processor 1022, and may be configured to store a program and data that are necessary for the communication apparatus 1000 to implement functions. The processor 1022 is configured to support the communication apparatus 1000 in performing a corresponding function in the foregoing method, and the function may be implemented by invoking the program stored in the memory 1021.

Specifically, the transceiver 1010 may be a wireless transceiver, and may be configured to support the communication apparatus 1000 in sending and receiving signaling and/or data through a radio air interface. The transceiver 1010 may also be referred to as a transceiver unit or a communication unit. The transceiver 1010 may include one or more radio frequency units 1012 and one or more antennas 1011. The radio frequency unit, for example, a remote radio unit (RRU) or an active antenna unit (AAU), may be further configured to transmit a radio frequency signal and perform conversion between the radio frequency signal and a baseband signal. The one or more antennas may be further configured to radiate and receive the radio frequency signal. Optionally, the transceiver 1010 may include only the foregoing radio frequency unit. In this case, the communication apparatus 1000 may include the transceiver 1010, the memory 1021, the processor 1022, and an antenna.

The memory 1021 and the processor 1022 may be integrated or may be independent of each other. As shown in FIG. 10, the memory 1021 and the processor 1022 may be integrated into a control unit 1020 of the communication apparatus 1000. For example, the control unit 1020 may include a baseband unit (baseband unit, BBU) of an LTE base station, and the baseband unit may also be referred to as a digital unit (DU). Alternatively, the control unit 1020 may include a distributed unit (DU) and/or a centralized unit (CU) in a base station in 5G and future radio access technologies. The control unit 1020 may include one or more antenna panels. A plurality of antenna panels may jointly support a radio access network (for example, an LTE network) of a single access standard, or may separately support radio access networks (for example, an LTE network, a 5G network, or another network) of different access standards. The memory 1021 and the processor 1022 may serve one or more antenna panels. In other words, the memory 1021 and the processor 1022 may be separately disposed on each antenna panel. Alternatively, a plurality of antenna panels may share a same memory 1021 and processor 1022. In addition, a necessary circuit may be disposed on each antenna panel. For example, the circuit may be configured to implement coupling between the memory 1021 and the processor 1022. The transceiver 1010, the processor 1022, and the memory 1021 may be connected to each other through a bus (bus) structure and/or another connection medium.

Based on the structure shown in FIG. 10, when the communication apparatus 1000 needs to send data, the processor 1022 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 1000, the radio frequency unit receives a radio frequency signal through the antenna, converts the radio frequency signal into a baseband signal, and outputs the baseband signal to the processor 1022. The processor 1022 converts the baseband signal into data, and processes the data.

Based on the structure shown in FIG. 10, the transceiver 1010 may be configured to perform the foregoing steps performed by the transceiver module 820, and/or the processor 1022 may be configured to invoke instructions in the memory 1021 to perform the foregoing steps performed by the processing module 810.

Figure 11:
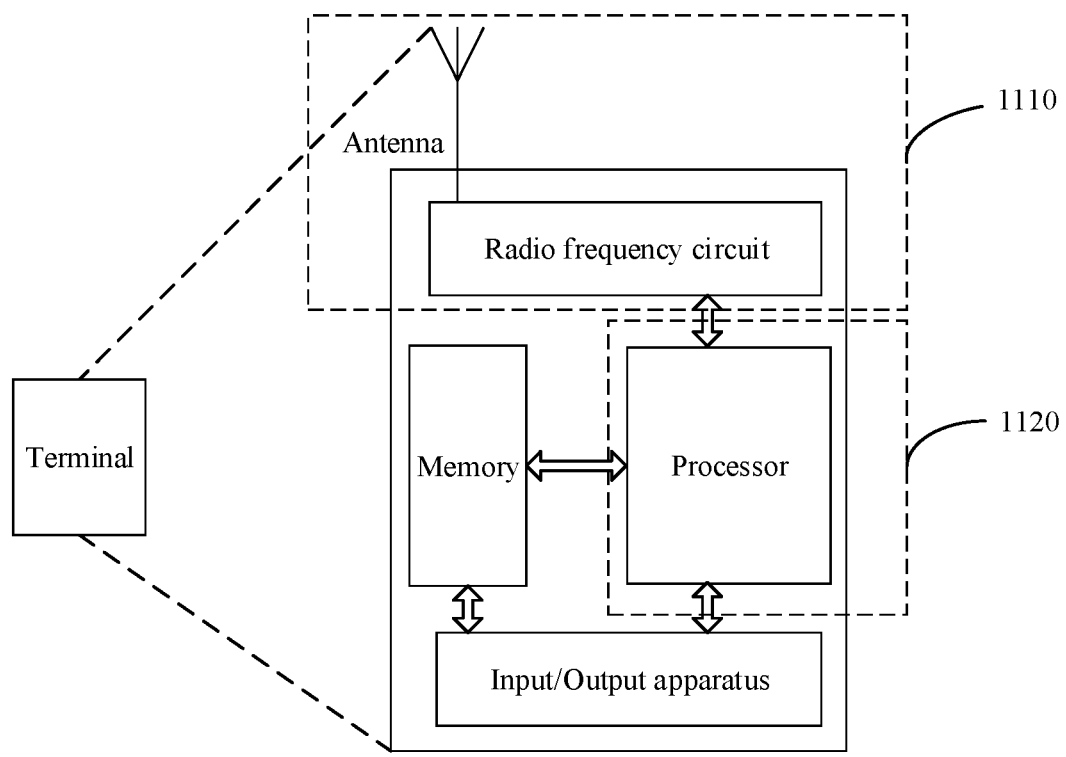
FIG. 11 is a schematic diagram of a structure of another communication apparatus according to an embodiment of this application.

FIG. 11 is a schematic diagram of a simplified structure of a terminal. For ease of understanding and illustration, in FIG. 11, an example in which the terminal is a mobile phone is used. As shown in FIG. 11, the terminal includes a processor, a memory, a radio frequency circuit, an antenna, and an input/output apparatus. The processor is mainly configured to process a communication protocol and communication data, control an on-board unit, execute a software program, and process data of the software program. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user. It should be noted that some types of devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver unit of the apparatus, and the processor having a processing function may be considered as a processing unit of the apparatus. As shown in FIG. 11, the apparatus includes a transceiver unit 1110 and a processing unit 1120. The transceiver unit 1110 may also be referred to as a transceiver, a transceiver machine, a transceiver apparatus, or the like. The processing unit 1120 may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit 1110 sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1110 is configured to perform a sending operation and a receiving operation on a terminal side in the foregoing method embodiment, and the processing unit 1120 is configured to perform an operation other than the receiving/sending operation of the terminal in the foregoing method embodiments.

For example, in an implementation, the transceiver unit 1110 may be configured to perform S502 and S503 in the embodiment shown in FIG. 5, and/or configured to support another process of the technology described in this specification. The processing unit 1120 is configured to perform S504 in the embodiment shown in FIG. 5, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. Specifically, the communication system includes a network device and a terminal, or may include a plurality of network devices and a plurality of terminals. For example, the communication system includes a network device and a terminal that are configured to implement related functions in the embodiment in FIG. 5.

The network device is separately configured to implement functions of a part related to a base station in embodiments of this application, for example, configured to implement functions of a part related to the base station in the embodiment shown in FIG. 5. The terminal is configured to implement functions of a part related to a terminal in embodiments of this application, for example, is configured to implement functions of the related terminal in the embodiment shown in FIG. 5. For details, refer to the related descriptions in the method embodiment. Details are not described herein again.

An embodiment of this application further provides a computer-readable storage medium, including instructions. When the instructions run on a computer, the computer is enabled to perform the method performed by the base station in embodiments of this application, for example, perform the method performed by the base station in the embodiment shown in FIG. 5. Alternatively, when the instructions run on a computer, the computer is enabled to perform the method performed by the terminal in embodiments of this application, for example, perform the method performed by the terminal in the embodiment shown in FIG. 5.

An embodiment of this application further provides a computer program product, including instructions. When the instructions run on a computer, the computer is enabled to perform the method performed by the base station in embodiments of this application, for example, perform the method performed by the base station in the embodiment shown in FIG. 5. Alternatively, when the instructions run on a computer, the computer is enabled to perform the method performed by the terminal in embodiments of this application, for example, perform the method performed by the terminal in the embodiment shown in FIG. 5.

An embodiment of this application provides a chip system. The chip system includes a processor and may further include a memory, to implement functions of the network device or the terminal in the method, or to implement functions of the network device and the terminal in the method. The chip system may include a chip, or may include a chip and another discrete component.

A person of ordinary skill in the art may be aware that, in combination with illustrative logical blocks (illustrative logical block) described in embodiments disclosed in this specification and steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

It should be noted that in embodiments of this application, "used to indicate" may include used to directly indicate and used to indirectly indicate. For example, when a piece of indication information is described as being used to indicate information I, the indication information may directly indicate I or indirectly indicate I, but it does not necessarily indicate that the indication information carries I.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. Alternatively, it may be agreed that a piece of information carries or does not carry an identifier as an indication of the to-be-indicated information.

Furthermore, specific indication manners may alternatively be various existing indication manners, for example, but not limited to, the foregoing indication manners and various combinations thereof. For details of the various indication manners, refer to the conventional technology. The details are not described in this specification. It can be learned from the foregoing descriptions that, for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manner in embodiments of this application should be understood as covering various methods that can enable a to-be-indicated party to learn of the to-be-indicated information.

In addition, the to-be-indicated information may have other equivalent forms. It should be understood that the technical solutions provided in embodiments of this application cover various forms. For example, some or all features in embodiments of this application should be understood as covering various representation forms of the features.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmit end device by sending configuration information to a receive end device. The configuration information may include, for example, but not limited to, one of or a combination of at least two of radio resource control signaling, for example, RRC signaling, MAC layer signaling, for example, MAC-CE signaling, and physical layer signaling, for example, downlink control information (DCI).

In embodiments of this application, a time domain concept or a time domain unit may include a frame, a radio frame, a system frame, a subframe, a half frame, a slot, a mini-slot, a symbol, and the like.

It should be understood that the terms "system" and "network" may be used interchangeably in embodiments of this application. "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first information and second information are merely used to distinguish between different indication information, and do not indicate different priorities, importance, or the like of the two types of information.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In addition, the term "for example" in embodiments of this application is used to represent an example or a description. Any embodiment or implementation solution described as an "example" in embodiments of this application should not be explained as being more preferred than another embodiment or implementation solution. That is, using the word "example" is intended to describe a concept in a specific manner.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of sending a demodulation reference signal (DMRS), comprising:
    obtaining indication information, wherein the indication information indicates delay segmentation locations that respectively correspond to M demodulation reference signal (DMRS) port signals;
    generating a first signal, wherein the first signal is formed by superimposing the M DMRS port signals, the delay segmentation locations corresponding to at least two of the M DMRS port signals are different, and M is an integer greater than or equal to 2, and wherein the delay segmentation location of a DMRS port signal in the M DMRS port signals corresponds to an interval in a delay domain representing a signal delay in which the DMRS port signal arrives at a receive end; and
    sending the first signal on a first time-frequency resource.

2. The method according to claim 1, wherein there is a first correspondence between M DMRS ports corresponding to the M DMRS port signals and the delay segmentation locations.

3. The method according to claim 1, wherein there is at least one DMRS port in M DMRS ports corresponding to the M DMRS port signals, and for any one of the at least one DMRS port, delay segmentation locations corresponding to all physical resource groups (PRGs) associated with the DMRS port are the same; or
there is at least one DMRS port in the M DMRS ports corresponding to the M DMRS port signals, and for any one of the at least one DMRS port, delay segmentation locations corresponding to at least two of the PRGs associated with the DMRS port are different.

4. The method according to claim 1, wherein there is a second correspondence between a size of a physical resource group (PRG) associated with a DMRS port and a quantity of delay segmentation locations corresponding to the DMRS port.

5. The method according to claim 1, wherein there is a third correspondence between a size of a PRG associated with a DMRS port and a frequency-domain reference signal density of the DMRS port.

6. A communication apparatus, comprising at least one processor, and one or more memories coupled to the at least one processor and storing programming instructions for execution by the at least one processor to perform operations comprising:
obtaining indication information, wherein the indication information indicates delay segmentation locations that respectively correspond to M demodulation reference signal (DMRS) port signals;
generating a first signal, wherein the first signal is formed by superimposing the M demodulation reference signal (DMRS) port signals, the delay segmentation locations corresponding to at least two of the M DMRS port signals are different, and M is an integer greater than or equal to 2, and wherein the delay segmentation location of a DMRS port signal in the M DMRS port signals corresponds to an interval in a delay domain representing a signal delay in which the DMRS port signal arrives at a receive end; and
sending the first signal on a first time-frequency resource.

7. The communication apparatus according to claim 6, wherein there is a first correspondence between M DMRS ports corresponding to the M DMRS port signals and the delay segmentation locations.

8. The communication apparatus according to claim 7, wherein there is a second correspondence between a size of a physical resource groups (PRG) associated with a DMRS port and a quantity of delay segmentation locations corresponding to the DMRS port.

9. The communication apparatus according to claim 8, wherein there is a third correspondence between a size of a PRG associated with a DMRS port and a frequency-domain reference signal density of the DMRS port.

10. The communication apparatus according to claim 6, wherein there is at least one DMRS port in the M DMRS ports corresponding to the M DMRS port signals, and for any one of the at least one DMRS port, delay segmentation locations corresponding to all physical resource groups (PRGs) associated with the DMRS port are the same; or
there is at least one DMRS port in the M DMRS ports corresponding to the M DMRS port signals, and for any one of the at least one DMRS port, delay segmentation locations corresponding to at least two of the PRGs associated with the DMRS port are different.

11. The communication apparatus according to claim 6, wherein the communication apparatus is a chip or a chip system.

12. A non-transitory computer-readable storage medium, wherein the non-transitory computer-readable storage medium stores a computer program for being executed by at least one processor to perform operations comprising:
obtaining indication information, wherein the indication information indicates delay segmentation locations that respectively correspond to M demodulation reference signal (DMRS) port signals;
generating a first signal, wherein the first signal is formed by superimposing the M demodulation reference signal (DMRS) port signals, delay segmentation locations corresponding to at least two of the M DMRS port signals are different, and M is an integer greater than or equal to 2, and wherein the delay segmentation location of a DMRS port signal in the M DMRS port signals corresponds to an interval in a delay domain representing a signal delay in which the DMRS port signal arrives at a receive end; and
sending the first signal on a first time-frequency resource.

13. The non-transitory computer-readable storage medium according to claim 12, wherein there is a first correspondence between M DMRS ports corresponding to the M DMRS port signals and the delay segmentation locations.

14. The non-transitory computer-readable storage medium according to claim 13, wherein there is a second correspondence between a size of a PRG associated with a DMRS port and a quantity of delay segmentation locations corresponding to the DMRS port.

15. The non-transitory computer-readable storage medium according to claim 14, wherein there is a third correspondence between a size of a PRG associated with a DMRS port and a frequency-domain reference signal density of the DMRS port.

16. The non-transitory computer-readable storage medium according to claim 12, wherein there is at least one DMRS port in the M DMRS ports corresponding to the M DMRS port signals, and for any one of the at least one DMRS port, delay segmentation locations corresponding to all physical resource groups (PRGs) associated with the DMRS port are the same; or
there is at least one DMRS port in the M DMRS ports corresponding to the M DMRS port signals, and for any one of the at least one DMRS port, delay segmentation locations corresponding to at least two of the PRGs associated with the DMRS port are different.

* * * * *